(12) United States Patent
Matsukuma et al.

(10) Patent No.: US 10,156,161 B2
(45) Date of Patent: Dec. 18, 2018

(54) COMPRESSED FLUID STORAGE POWER GENERATION DEVICE

(71) Applicant: Kobe Steel, Ltd., Hyogo (JP)

(72) Inventors: Masaki Matsukuma, Hyogo (JP); Hiroki Saruta, Takasago (JP); Kanami Sakamoto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 162 days.

(21) Appl. No.: 15/504,390

(22) PCT Filed: Aug. 25, 2015

(86) PCT No.: PCT/JP2015/073884
§ 371 (c)(1),
(2) Date: Feb. 16, 2017

(87) PCT Pub. No.: WO2016/031821
PCT Pub. Date: Mar. 3, 2016

(65) Prior Publication Data
US 2017/0234171 A1    Aug. 17, 2017

(30) Foreign Application Priority Data

Aug. 27, 2014  (JP) .................................. 2014-172836
Jan. 6, 2015   (JP) .................................. 2015-001042

(51) Int. Cl.
*F01K 27/02*     (2006.01)
*F01D 25/12*     (2006.01)
(Continued)

(52) U.S. Cl.
CPC ............. *F01K 27/02* (2013.01); *F01D 25/10* (2013.01); *F01D 25/12* (2013.01); *F01K 3/18* (2013.01);
(Continued)

(58) Field of Classification Search
CPC ... F01K 27/02; F01K 7/16; F01K 3/18; F01D 25/12; F01D 25/10; F02C 6/16; F05D 2260/213; Y02E 60/15
(Continued)

(56) References Cited

U.S. PATENT DOCUMENTS 5,934,063 A  *  8/1999  Nakhamkin .............. F02C 6/06
                                                     60/727
7,448,213 B2 * 11/2008  Mitani .................... F01K 3/006
                                                     60/616
(Continued)

FOREIGN PATENT DOCUMENTS

JP       2013-536357       9/2013

OTHER PUBLICATIONS

International Search Report issued in PCT/JP2015/073884; dated Dec. 1, 2015.

*Primary Examiner* — Hoang Nguyen
(74) *Attorney, Agent, or Firm* — Studebaker & Brackett PC

(57) ABSTRACT

A compressed fluid storage power generation device including a compressor and compressor bodies for compressing a working fluid; a pressure accumulation tank for storing the working fluid compressed by the compressor bodies; a power generator having expanders which are driven by the working fluid and a power generator body which is driven by the expanders; high-temperature heat recovery units for recovering heat from the working fluid flowing from the compressor bodies into the pressure accumulation tank; high-temperature heating units for heating, with the recovered heat, the working fluid flowing from the pressure accumulation tank into the expanders; a low-temperature heat recovery unit for recovering heat generated in a low-temperature heat generation section of the compressor and/or power generator into a low-temperature heat carrier; and low-temperature heating units for heating the working fluid by means of heat exchange with the low-temperature heat carrier carrying the heat recovered by the low-temperature heat recovery unit.

23 Claims, 16 Drawing Sheets

(51) Int. Cl.
*F01K 7/16* (2006.01)
*F02C 6/16* (2006.01)
*F01K 3/18* (2006.01)
*F01D 25/10* (2006.01)

(52) U.S. Cl.
CPC ............... *F01K 7/16* (2013.01); *F02C 6/16* (2013.01); *F05D 2260/213* (2013.01); *Y02E 60/15* (2013.01)

(58) Field of Classification Search
USPC .......................................... 60/650, 682–684
See application file for complete search history.

(56) References Cited

U.S. PATENT DOCUMENTS

| | | | |
|---|---|---|---|
| 8,261,552 B2* | 9/2012 | Nakhamkin | F01K 3/12 60/659 |
| 8,495,872 B2* | 7/2013 | McBride | F15B 11/06 60/511 |
| 8,656,712 B2* | 2/2014 | Howes | F01K 3/12 60/515 |
| 2012/0036853 A1 | 2/2012 | Kidd et al. | |
| 2016/0348840 A1* | 12/2016 | Nagura | F17C 7/00 |

* cited by examiner

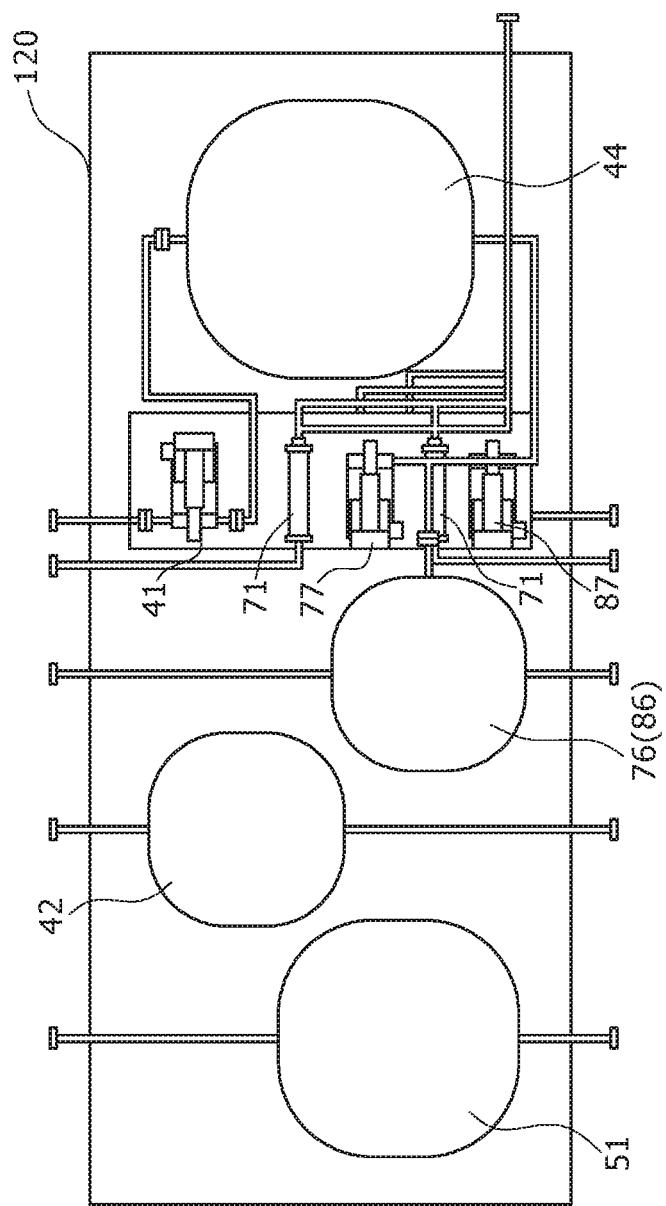

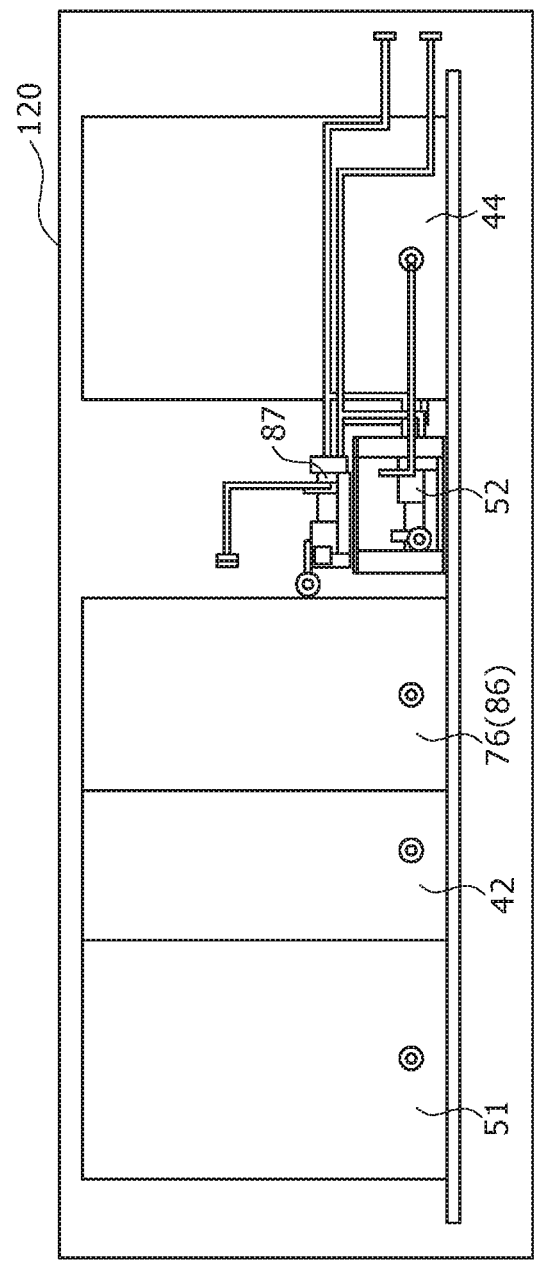

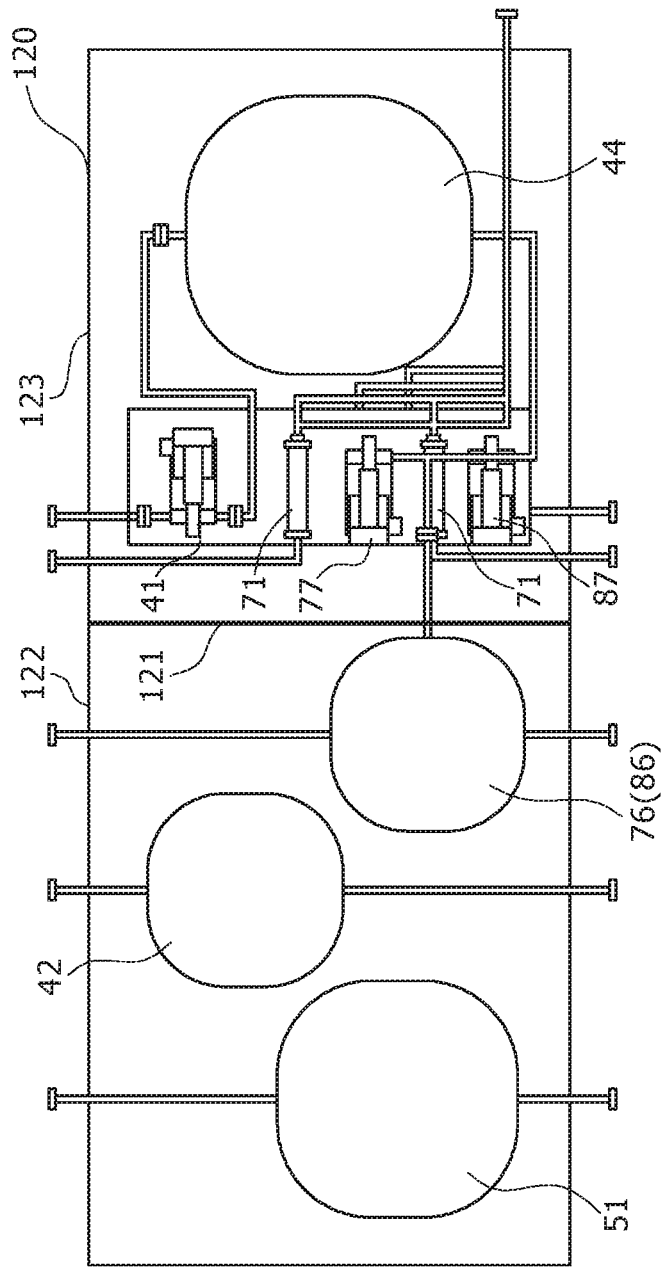

COMPRESSED FLUID STORAGE POWER GENERATION DEVICE

TECHNICAL FIELD

The present invention relates to a compressed fluid storage power generation device.

BACKGROUND ART

Patent Document 1 discloses a compressed air energy storage system, which accumulates, in a compressed gas accumulation device, a compressed gas from which heat is recovered by a heat exchanger arranged on a downstream of a compressor, and heats the gas taken out from the accumulation device by the recovered heat, thereby supplying the gas to a power generation device.

In this system, the heat of the compressed gas from the compressor is recovered by a high-temperature heat exchanger and a low-temperature heat exchanger. However, in either case, the heat is recovered only from the same compressed gas and heat recovery from heat sources other than the compressed gas is not considered.

CITATION LIST

Patent Document

Patent Document 1: JP 2013-536357 T

SUMMARY OF THE INVENTION

Technical Problem

An object of the present invention is to improve power generation efficiency in a compressed fluid storage power generation device by reusing heat from a low-temperature heat source.

Solution to Problem

In order to achieve the aforementioned object, the present invention provides a compressed fluid storage power generation device that comprises: a compressor having a drive source and a compressor main body for compressing a working fluid by being driven by the drive source; a pressure accumulation unit for storing the working fluid compressed by the compressor main body; a power generator having an expander driven by the working fluid supplied from the pressure accumulation unit and a power generator main body driven by the expander; a high-temperature heat recovery unit for recovering heat from the working fluid flowing from the compressor main body into the pressure accumulation unit; a high-temperature heating unit for heating the working fluid flowing from the pressure accumulation unit into the expander by the heat recovered by the high-temperature heat recovery unit; a low-temperature heat recovery unit for recovering heat generated in a low-temperature heat generation section in at least one of the compressor and the power generator to a low-temperature heat carrier; and a low-temperature heating unit for heating the working fluid by heat exchange with the low-temperature heat carrier conveying the heat recovered by the low-temperature heat recovery unit.

According to this configuration, the working fluid flowing from the pressure accumulation unit into the expander can be heated in the high-temperature heating unit by the heat recovered, in the high-temperature heat recovery unit, from the working fluid flowing from the compressor main body into the pressure accumulation unit. Thus, heat efficiency can be improved. Further, the working fluid can be heated in the low-temperature heating unit by the heat recovered in the low-temperature heat recovery unit from the low-temperature heat generation section in at least one of the compressor and the power generator. Thus, heat efficiency can be further improved. Accordingly, improvement of power generation efficiency can be realized in the compressed fluid storage power generation device by reusing the heat from the low temperature heat source. That is, the power generation efficiency can be improved in the compressed fluid storage power generation device by minimizing the heat exhausted in the low-temperature heat generation section without being used for power generation and thereby improving the heat efficiency.

Advantageous Effects of Invention

According to the present invention, in the compressed fluid storage power generation device, the working fluid can be heated in the low-temperature heating unit by the heat recovered in the low-temperature heat recovery unit from the low-temperature heat generation section in at least one of the compressor and the power generator. Thus, improvement of the power generation efficiency can be realized by reusing the heat from the low temperature heat source.

BRIEF DESCRIPTION OF DRAWINGS

FIG. 15A is a plan view of a group of heat accumulation tanks in a compressed fluid storage power generation device according to a fourth embodiment.

FIG. 15B is an elevation view of the group of heat accumulation tanks in the compressed fluid storage power generation device according to the fourth embodiment.

FIG. 16 is a plan view illustrating a modification of the group of heat accumulation tanks in the compressed fluid storage power generation device according to the fourth embodiment.

DESCRIPTION OF EMBODIMENTS

Hereinafter, embodiments of the present invention will be described with reference to the drawings.

First Embodiment

Figure 1:
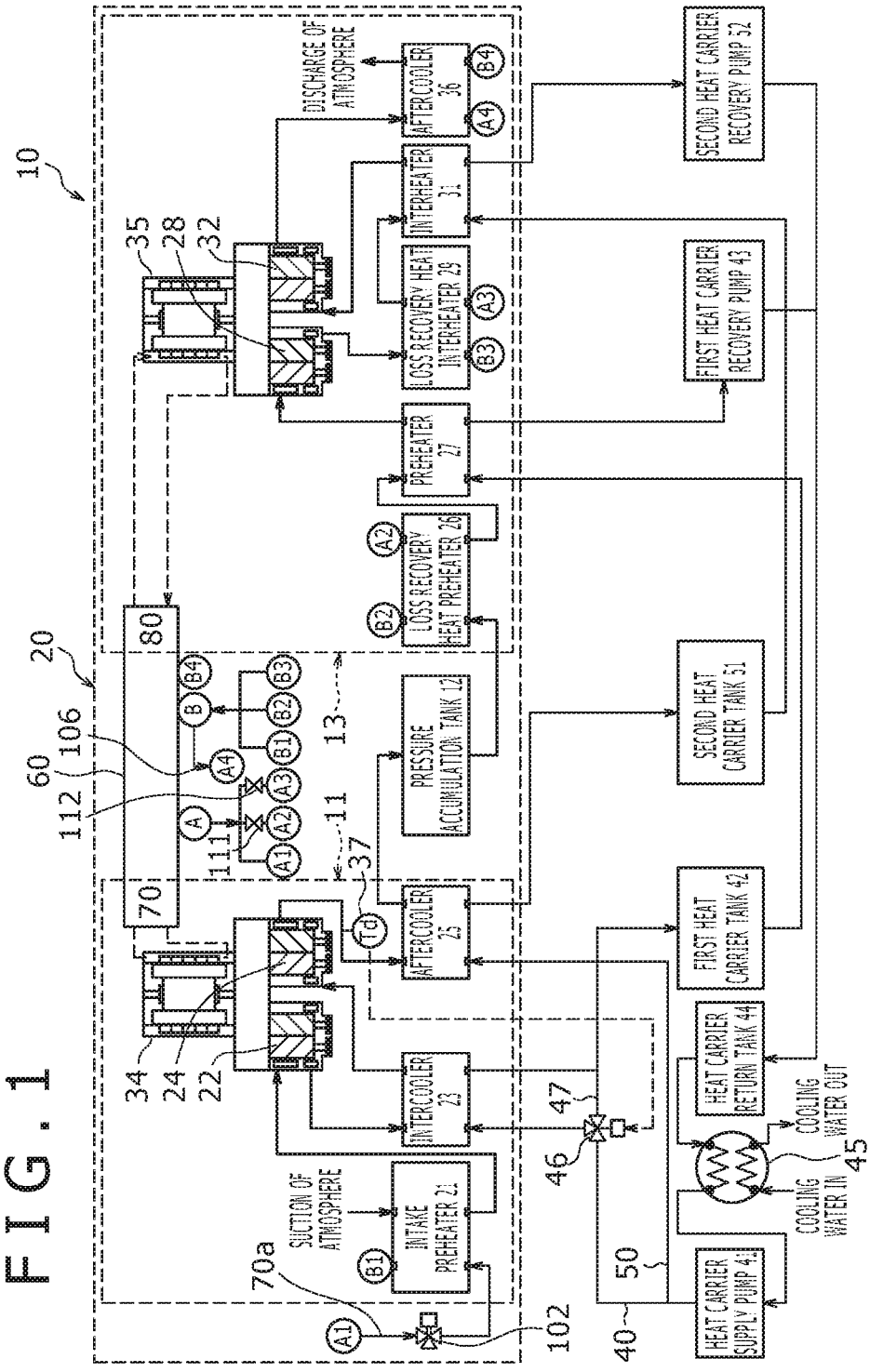
FIG. 1 is a schematic diagram of a compressed fluid storage power generation device according to a first embodiment of the present invention.
Figure 2:
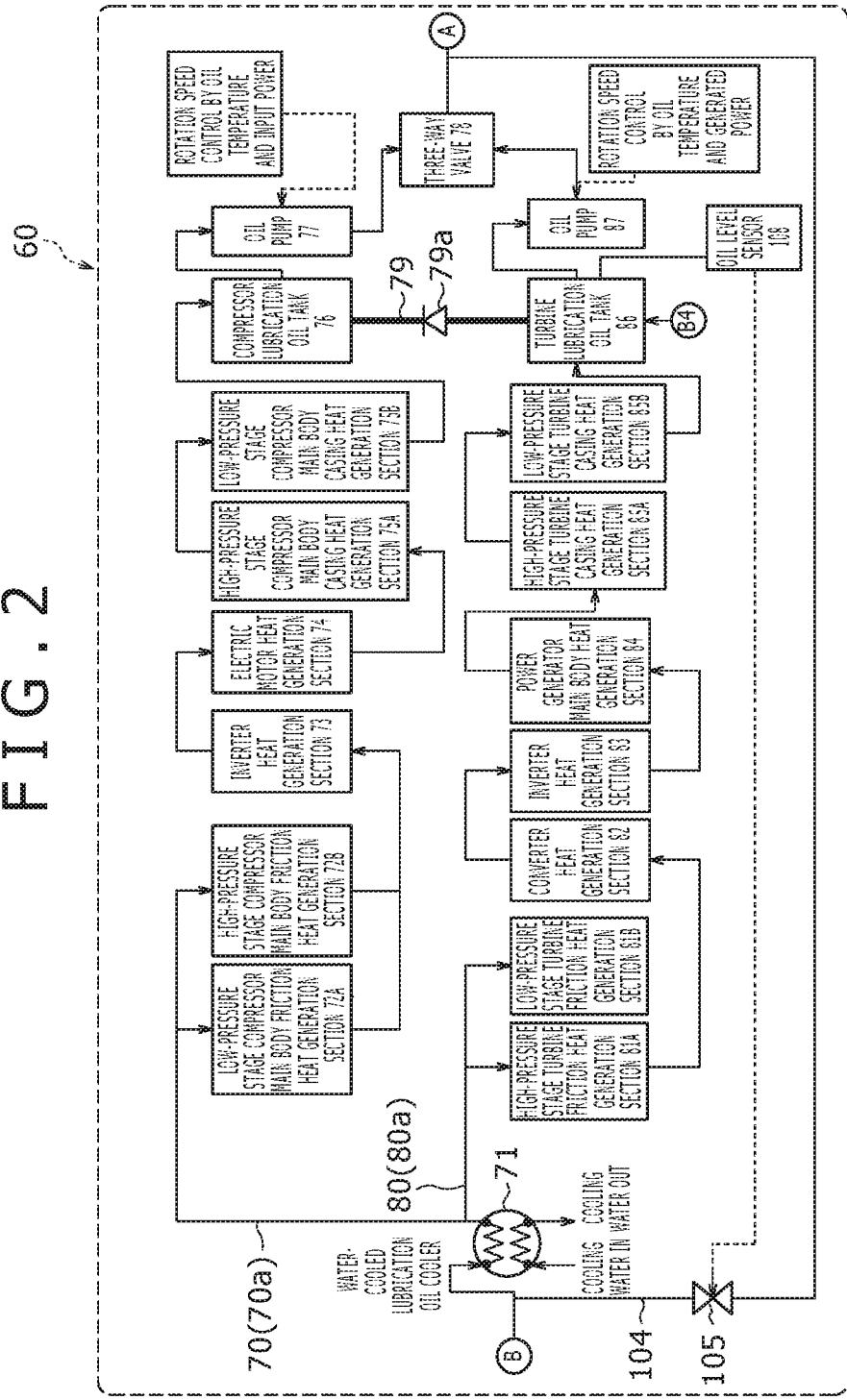
FIG. 2 is a diagram showing a low-temperature heat carrier system in the compressed fluid storage power generation device according to the first embodiment.

FIG. 1 shows a compressed fluid storage power generation device 10 according to a first embodiment of the present invention. FIG. 2 shows a low-temperature heat carrier system in the compressed fluid storage power generation device 10 according to the first embodiment. The compressed fluid storage power generation device 10 is a power generation device that generates power by compressing air as a working fluid during compression of the working fluid in a compressor 11, storing the compressed air in a pressure accumulation tank (pressure accumulation unit) 12, and supplying the compressed air stored in the pressure accumulation tank 12 to a power generator 13 during power generation of the power generator 13. In the compressed fluid storage power generation device 10, heat is recovered from air flowing from compressor main bodies 22 and 24 into the pressure accumulation tank 12 by high-temperature heat recovery units (intercooler 23 and aftercooler 25). The air flowing from the pressure accumulation tank 12 into expanders 28 and 32 is heated by the recovered heat in high-temperature heating units (a preheater 27 and an interheater 31). Further, the working fluid flowing through the compressed fluid storage power generation device 10 is heated in low-temperature heating units (an intake preheater 21, a loss recovery heat preheater 26, and a loss recovery heat interheater 29) by heat from low-temperature heat generation sections, the heat being caused by a power loss and the like and recovered to a low-temperature heat carrier in low-temperature heat recovery units in the compressor 11 and the power generator 13. In this manner, the heat from the compressed working fluid and the heat from the low temperature heat sources other than the compressed working fluid are recovered to improve heat efficiency, which in turns improves power generation efficiency.

The compressed fluid storage power generation device 10 comprises an air system 20, a first high-temperature heat carrier system 40, a second high-temperature heat carrier system 50, and a low-temperature heat carrier system 60.

(Air System)

Referring to FIG. 1, the air system 20 is formed by sequentially arranging, along an air flow, an intake preheater (first low-temperature preheater) 21, a low-pressure stage compressor main body 22, an intercooler 23, a high-pressure stage compressor main body 24, an aftercooler 25, a pressure accumulation tank 12, a loss recovery heat preheater (second low-temperature preheater) 26, a preheater 27, a high-pressure stage expander 28, a loss recovery heat interheater (third low-temperature preheater) 29, an interheater 31, a low-pressure stage expander 32, and an aftercooler (power generator side aftercooler) 36.

The intake preheater 21 is provided on an upstream of the low-pressure stage compressor main body 22. The intake preheater 21 is a heat exchanger for exchanging heat between air being sucked into the low-pressure stage compressor main body 22 from the outside and a low-temperature heat carrier (oil flowing in from oil circulation passages 70a and 80a), of the low-temperature heat carrier system 60, conveying heat which is caused by a power loss and the like and recovered by the low-temperature heat recovery units in the compressor 11 and the power generator 13. The intake preheater 21 constitutes the low-temperature heating unit.

Figure 3:
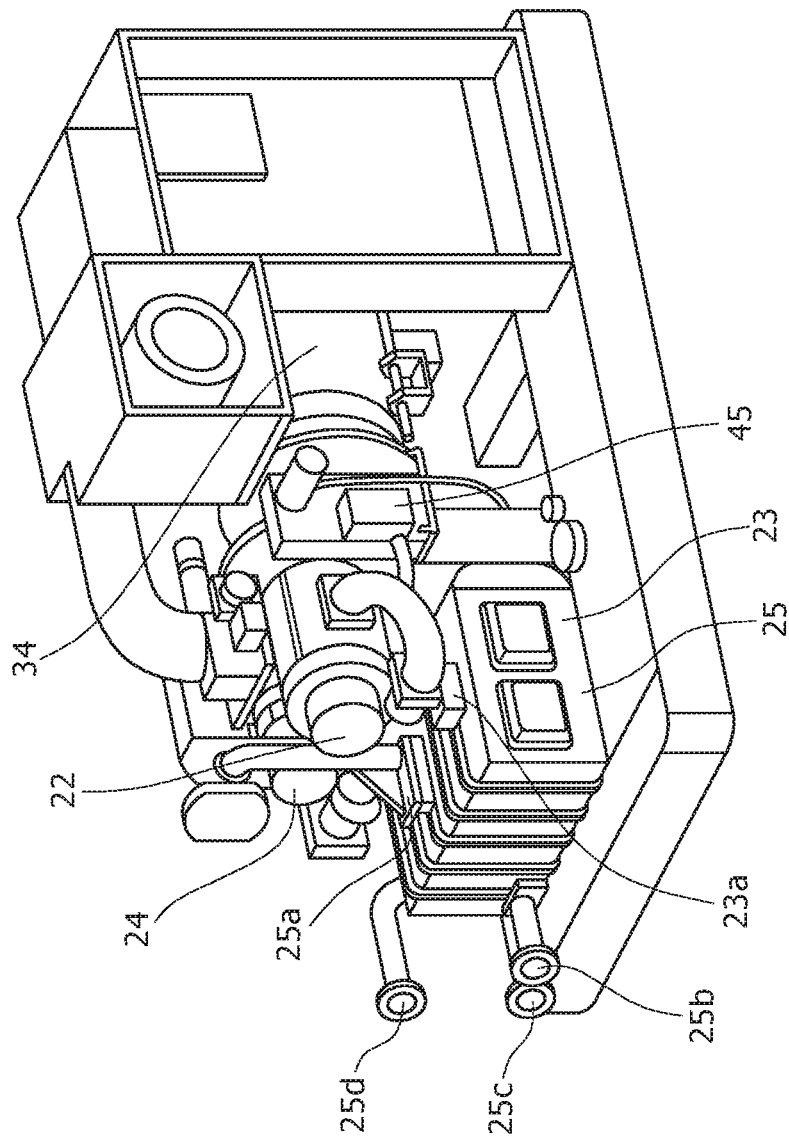
FIG. 3 is a perspective view of a unit including a compressor and a high-temperature heat recovery unit according to the first embodiment.

In the present embodiment, the low-pressure stage compressor main body 22 is a positive displacement-type screw compressor main body. The low-pressure stage compressor main body 22 is driven by an electric motor (drive source) 34 by control of a control device (not illustrated), and sucks in and compresses the air heated by the intake preheater 21. The low-pressure stage compressor main body 22 in a unit shown in FIG. 3 is a structural component of the compressor 11. The compressor 11 comprises the electric motor 34 having an inverter (not illustrated), which controls a rotation speed of the low-pressure stage compressor main body 22.

As shown in FIG. 1 and FIG. 3 to FIG. 5, the intercooler 23 is a heat exchanger for exchanging heat between the compressed air introduced from an air inlet 23a and led out from an air outlet 23b of the air system 20 and a first high-temperature heat carrier (oil) introduced from a heat carrier inlet 23c and led out from a heat carrier outlet 23d of the first high-temperature heat carrier system 40. The intercooler 23 constitutes the high-temperature heat recovery unit.

Referring to FIG. 1, in the present embodiment, the high-pressure stage compressor main body 24 is a positive displacement-type screw compressor main body. The high-pressure stage compressor main body 24 is driven by the electric motor 34 by control of the control device (not illustrated), and sucks in and compresses the compressed air cooled by the intercooler 23. The high-pressure stage compressor main body 24 in the unit shown in FIG. 3 is a structural component of the compressor 11. A compressed air temperature sensor 37 for detecting a temperature T of the discharged compressed air is provided on a discharge side of the high-pressure stage compressor main body 24 of the air system 20.

Figure 4:
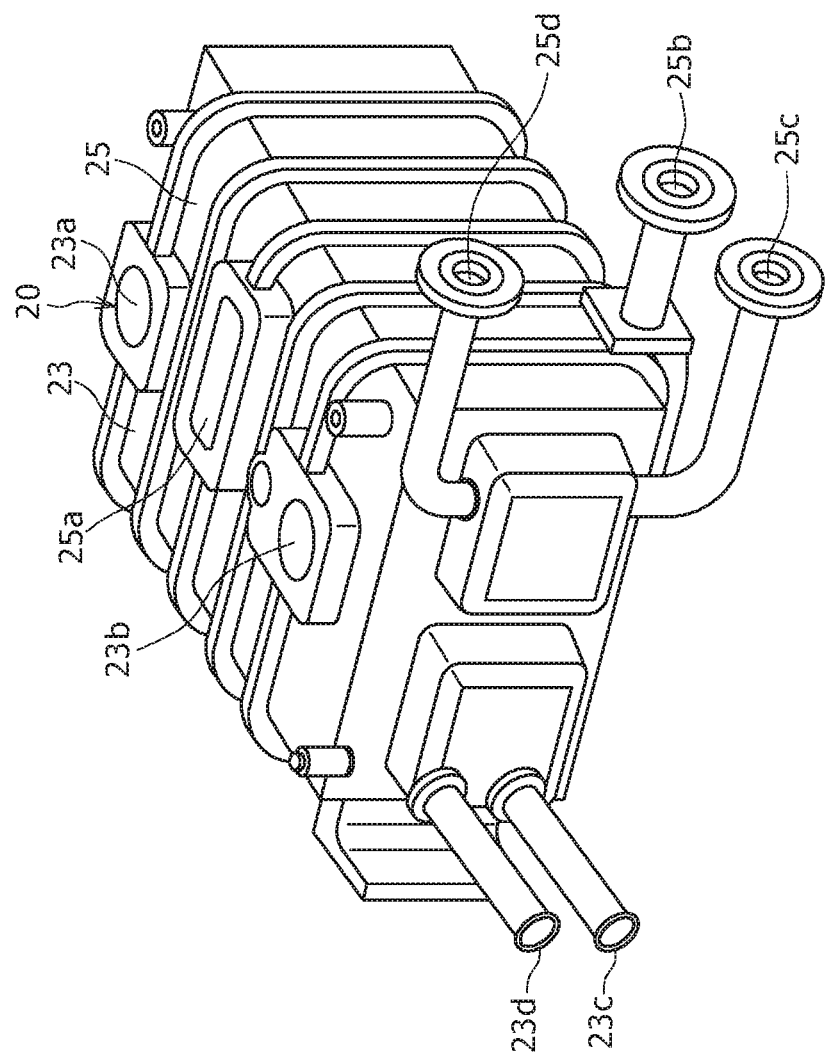
FIG. 4 is a perspective view of a cooler in which an intercooler and an aftercooler are integrally formed.
Figure 5:
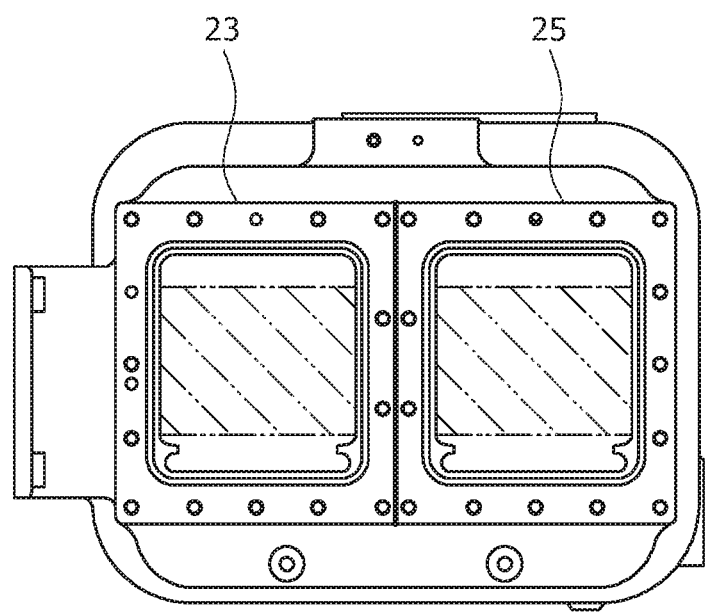
FIG. 5 is a side view of the intercooler and the aftercooler without a cover.

As shown in FIG. 1, FIG. 3 and FIG. 4, the aftercooler 25 is a heat exchanger for exchanging heat between the compressed air introduced from an air inlet 25a and led out from an air outlet 25b of the air system 20 and a second high-temperature heat carrier (oil). The second high-temperature heat carrier (oil) is introduced from a heat carrier inlet 25c of the second high-temperature heat carrier system 50, which is branched from the first high-temperature heat carrier system 40 between a heat carrier supply pump 41 and a three-way valve 46 described below. The second high-temperature heat carrier (oil) is led out from a heat carrier outlet 25d. A temperature of the second high-temperature heat carrier (oil) of the aftercooler 25 is higher than that of the first high-temperature heat carrier (oil). The aftercooler 25 constitutes the high-temperature heat recovery unit.

Referring to FIG. 1, the pressure accumulation tank 12 stores the air compressed by the low-pressure stage compressor main body 22 and the high-pressure stage compressor main body 24 during compression of the working fluid in the compressor 11. That is, the air compressed by the low-pressure stage compressor main body 22 and the high-pressure stage compressor main body 24 is accumulated in the pressure accumulation tank 12. Further, the compressed air stored in the pressure accumulation tank 12 is supplied to the power generator 13 during power generation of the power generator 13. An inlet (not illustrated) and an outlet (not illustrated) of the pressure accumulation tank 12 are provided with an inlet valve (not illustrated) and an outlet valve (not illustrated), respectively. During the compression of the working fluid in the compressor 11, the inlet valve (not illustrated) of the pressure accumulation tank 12 is opened by the control device (not illustrated). Further, during the power generation of the power generator 13, the outlet valve (not illustrated) of the pressure accumulation tank 12 is opened. It is noted that both the inlet valve (not illustrated) and the outlet valve (not illustrated) of the pressure accumulation tank 12 are closed except during the compression of the working fluid and during the power generation.

The loss recovery heat preheater 26 is a heat exchanger for exchanging heat between the compressed air introduced from an air inlet and led out from an air outlet of the air system 20 and a low-temperature heat carrier (oil) introduced from a heat carrier inlet (a connection portion indicated by A2 in FIG. 1) and led out from a heat carrier outlet (a connection portion indicated by B2 in FIG. 1) of the low-temperature heat carrier system 60. The loss recovery heat preheater 26 constitutes the low-temperature heating unit.

Figure 6:
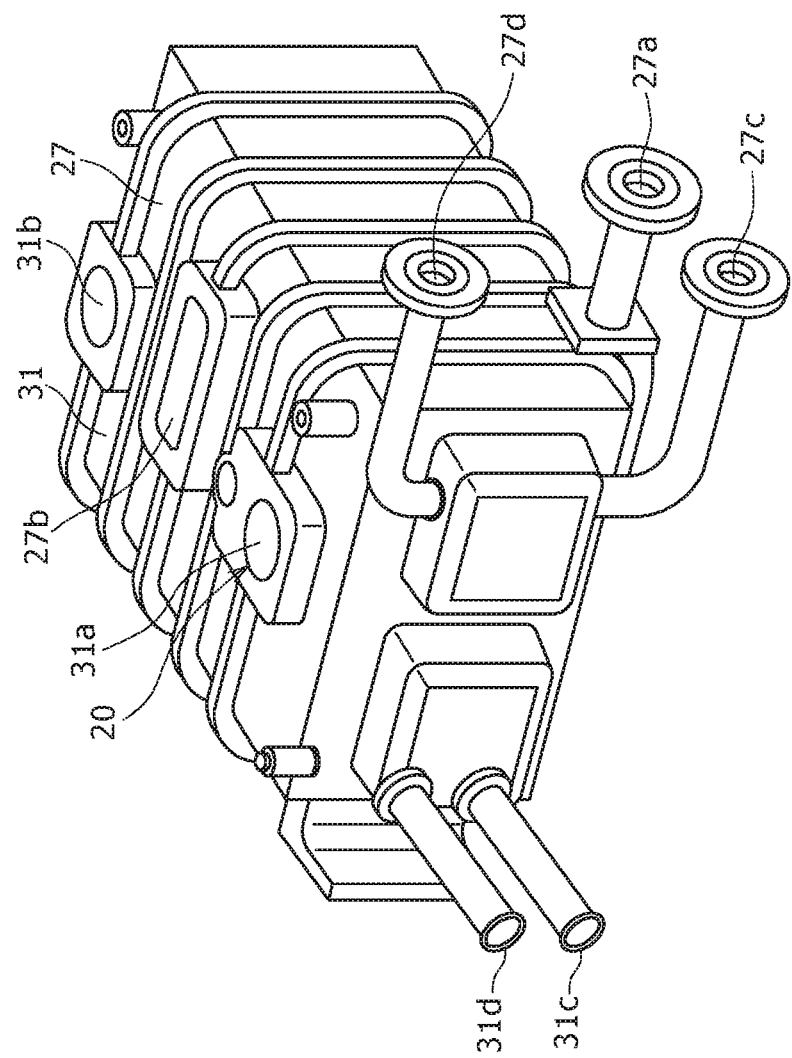
FIG. 6 is a perspective view of a heater in which a preheater and an interheater are integrally formed.
Figure 7:
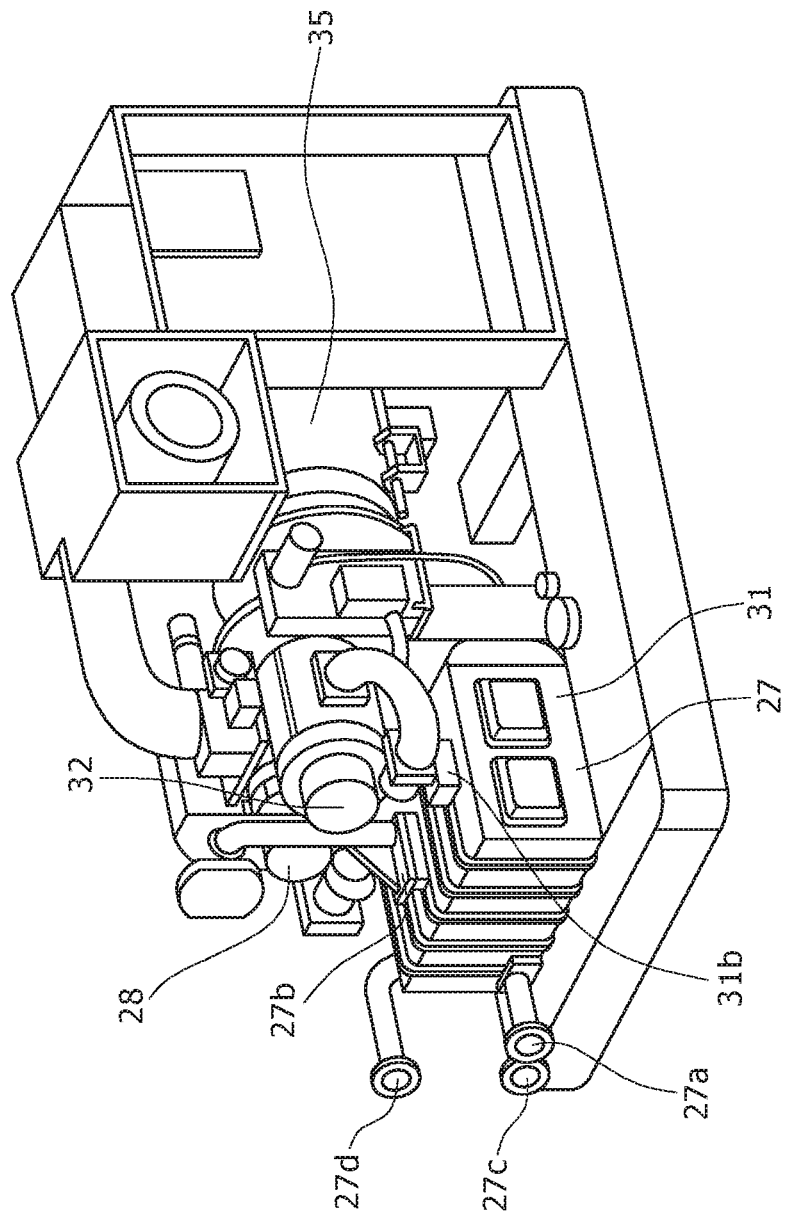
FIG. 7 is a perspective view of a unit including a power generator and a high-temperature heating unit according to the first embodiment.

As shown in FIG. 1, FIG. 6 and FIG. 7, the preheater 27 is a heat exchanger for exchanging heat between the compressed air introduced from an air inlet 27a and led out from an air outlet 27b of the air system 20 and the first high-temperature heat carrier (oil) of the first high-temperature heat carrier system 40. The first high-temperature heat carrier (oil) is introduced from a heat carrier inlet 27c of the first high-temperature heat carrier system 40. The first high-temperature heat carrier (oil) is led out from a heat carrier outlet 27d of the first high-temperature heat carrier system 40. The preheater 27 constitutes the high-temperature heating unit.

Referring to FIG. 1 and FIG. 7, in the present embodiment, the high-pressure stage expander 28 is a positive displacement-type screw turbine. The high-pressure stage expander 28 is driven by the compressed air supplied from the pressure accumulation tank 12. A power generator main body 35 is driven as the high-pressure stage expander 28 is driven. The high-pressure stage expander 28 is a structural component of the power generator 13.

Referring to FIG. 1, the loss recovery heat interheater 29 is a heat exchanger for exchanging heat between the compressed air introduced from an air inlet and led out from an air outlet of the air system 20 and the low-temperature heat carrier (oil) introduced from a heat carrier inlet (a connection portion indicated by A3 in FIG. 1) and led out from a heat carrier outlet (a connection portion indicated by B3 in FIG. 1) of the low-temperature heat carrier system 60. The loss recovery heat interheater 29 constitutes the low-temperature heating unit.

As shown in FIG. 1, FIG. 6 and FIG. 7, the interheater 31 is a heat exchanger for exchanging heat between the compressed air introduced from an air inlet 31a and led out from an air outlet 31b of the air system 20 and the second high-temperature heat carrier (oil) introduced from a heat carrier inlet 31c and led out from a heat carrier outlet 31d of the second high-temperature heat carrier system 50. In the interheater 31, the heat recovered by the aftercooler 25 is transferred to the compressed air, which has been heated by the loss recovery heat interheater 29, via the second high-temperature heat carrier (oil), so that the compressed air is further heated. The interheater 31 constitutes the high-temperature heating unit.

Referring to FIG. 1 and FIG. 7, in the present embodiment, the low-pressure stage expander 32 is a positive displacement-type screw turbine. The low-pressure stage expander 32 is driven by the compressed air supplied from the pressure accumulation tank 12. The power generator main body 35 is driven as the low-pressure stage expander 32 is driven. The low-pressure stage expander 32 constitutes the power generator 13.

The aftercooler 36 is provided on a downstream of the low-pressure stage expander 32. The aftercooler 36 is a heat exchanger for exchanging heat between the air flowing in from the low-pressure stage expander 32 and the low-temperature heat carrier flowing in from a point B (see FIG. 1) as an inlet of the low-temperature heat carrier system 60 via a pint A4. The air system (working fluid passage) 20 inside the aftercooler 36 constitutes the low-temperature heat generation section. The low-temperature heat carrier system (low-temperature heat carrier passage) 60 inside the aftercooler 36 constitutes the low-temperature heat recovery unit.

(First High-Temperature Heat Carrier System)

Referring to FIG. 1, the first high-temperature heat carrier system 40 is formed by arranging, along a flow of the first high-temperature heat carrier (oil), a heat carrier supply pump 41, a three-way valve 46, the intercooler 23, a first heat carrier tank (first high-temperature heat accumulation unit) 42, the preheater 27, a first heat carrier recovery pump 43, a heat carrier return tank 44, and a first heat exchanger 45. The first high-temperature heat carrier (oil) having passed through the first heat exchanger 45 is returned to the heat carrier supply pump 41, thereby circulating through the first high-temperature heat carrier system 40.

The heat carrier supply pump 41 feeds the first high-temperature heat carrier (oil) supplied from the first heat exchanger 45. The heat carrier supply pump 41 is operated during the compression of the working fluid in the compressor 11. A rotation speed of the heat carrier supply pump 41 is controlled in proportion to the input power to the electric motor by the control device (not illustrated).

The three-way valve 46 is arranged to be able to switch between a passage connecting from the heat carrier supply pump 41 to the intercooler 23 and a passage connecting from the heat carrier supply pump 41 to the first heat carrier tank 42 by bypassing the intercooler 23. A bypass passage 47 connects the three-way valve 46 and the first high-temperature heat carrier system 40 between the intercooler 23 and the first heat carrier tank 42. A communication of the three-way valve 46 is switchable according to a detection value of the compressed air temperature sensor 37. That is, the three-way valve 46 switches the passages so as to control an allowable set value Td° C. of a discharge temperature of the high-pressure stage compressor main body 24 at a constant level.

As shown in FIG. 1, FIG. 3, and FIG. 4, in the intercooler 23 described above, the first high-temperature heat carrier (oil) introduced from the heat carrier inlet 23c and led out from the heat carrier outlet 23d of the first high-temperature heat carrier system 40 is heated by heat exchange with the compressed air of the air system 20.

Referring to FIG. 1, the first heat carrier tank 42 stores the first high-temperature heat carrier (oil) heated by the intercooler 23. That is, the first heat carrier tank 42 accumulates heat recovered by the intercooler 23.

In the preheater 27 described above, the heat recovered by the intercooler 23 is transferred to the compressed air via the first high-temperature heat carrier (oil), thus the first high-temperature heat carrier (oil) is cooled down.

The first heat carrier recovery pump 43 feeds the first high-temperature heat carrier (oil) supplied from the preheater 27 to the heat carrier return tank 44. The first heat carrier recovery pump 43 is operated by the control device (not illustrated) during power generation of the power generator 13. A rotation speed of the first heat carrier recovery pump 43 is controlled in proportion to output power of the power generator by the control device (not illustrated).

The heat carrier return tank 44 stores the first high-temperature heat carrier (oil) fed by the first heat carrier recovery pump 43.

As shown in FIG. 1 and FIG. 3, the first heat exchanger 45 is a heat exchanger for exchanging heat between a cooling water passage in which cooling water supplied from the outside flows and the first high-temperature heat carrier (oil) of the first high-temperature heat carrier system 40. In the first heat exchanger 45, the first high-temperature heat carrier (oil) is cooled down by heat exchange with the cooling water, thereby maintaining a temperature of the first high-temperature heat carrier (oil) flowing into the heat carrier supply pump 41 at a constant level.

(Second High-Temperature Heat Carrier System)

Referring to FIG. 1, the second high-temperature heat carrier system 50 is formed by arranging, along a flow of the second high-temperature heat carrier (oil), the heat carrier supply pump 41, the aftercooler 25, a second heat carrier tank (second high-temperature heat accumulation unit) 51, the interheater (high-temperature heating unit) 31, a second heat carrier recovery pump 52, the heat carrier return tank 44, and the first heat exchanger 45. The second high-temperature heat carrier (oil) having passed through the first heat exchanger 45 is returned to the heat carrier supply pump 41, thereby circulating through the second high-temperature heat carrier system 50. In the present embodiment, the heat carrier supply pump 41, the heat carrier return tank 44, and the first heat exchanger 45 are commonly used in the first high-temperature heat carrier system 40. That is, the second high-temperature heat carrier system 50 is branched from the first high-temperature heat carrier system 40 between the heat carrier supply pump 41 and the three-way valve 46, and merges with the first high-temperature heat carrier system 40 between the first heat carrier recovery pump 43 and the heat carrier return tank 44.

The heat carrier supply pump 41 is commonly used in the first high-temperature heat carrier system 40.

In the aftercooler 25 described above, the second high-temperature heat carrier (oil) of the second high-temperature heat carrier system 50 is heated by heat exchange with the compressed air of the air system 20.

The second heat carrier tank 51 stores the second high-temperature heat carrier (oil) heated by the aftercooler 25. That is, the second heat carrier tank 51 accumulates heat recovered by the aftercooler 25.

In the interheater 31 described above, the heat recovered by the aftercooler 25 is transferred to the compressed air via the second high-temperature heat carrier (oil), so that the second high-temperature heat carrier (oil) is cooled down.

The second heat carrier recovery pump 52 feeds the second high-temperature heat carrier (oil) from the interheater 31 to the heat carrier return tank 44. The second heat carrier recovery pump 52 is operated by the control device (not illustrated) during the power generation of the power generator 13. A rotation speed of the second heat carrier recovery pump 52 is controlled in proportion to output power of the power generator by the control device (not illustrated).

The heat carrier return tank 44 is commonly used in the first high-temperature heat carrier system 40.

The first heat exchanger 45 is commonly used in the first high-temperature heat carrier system 40.

(Low-Temperature Heat Carrier System)

Referring to FIG. 1 and FIG. 2, the low-temperature heat carrier system 60 comprises a compressor side low-temperature heat carrier system 70 and a power generator side low-temperature heat carrier system 80. In the present embodiment, the low-temperature heat carrier system 60 is constituted by the oil circulation passages 70a and 80a for circulating the low-temperature heat carrier (oil) between the low-temperature heat recovery units and the low-temperature heating units 21, 26 and 29. The low-temperature heat recovery units herein are constituted by the oil circulation passages 70a and 80a within areas where low-temperature heat generation sections 72A, 72B, 73, 74, 75A, 75B, 81A, 81B, 82, 83, 84, 85A, and 85B described below are arranged and areas where oil pumps 77 and 87 described below are arranged, and the aftercooler 36. The low-temperature heat carrier system 60 is provided with a bypass passage 104, which is branched from an upstream of a second heat exchanger 71 described below and merges with a downstream of a three-way valve 78 described below. A valve 105 is provided with the bypass passage 104. The valve 105 is controlled to open/close in accordance with an oil level detected by an oil level sensor 108 in a turbine lubrication oil tank 86 described below.

As shown in FIG. 2, the compressor side low-temperature heat carrier system 70 is formed by sequentially arranging, along a flow of the low-temperature heat carrier (oil), the second heat exchanger 71, a low-pressure stage compressor main body friction heat generation section 72A, a high-pressure stage compressor main body friction heat generation section 72B, an inverter heat generation section 73, an electric motor heat generation section 74, a high-pressure stage compressor main body casing heat generation section 75A, a low-pressure stage compressor main body casing heat generation section 75B, a compressor lubrication oil tank (low-temperature heat accumulation unit) 76, an oil pump 77, and a three-way valve 78. In the present embodiment, the second heat exchanger 71 and the three-way valve 78 are commonly used in the power generator side low-temperature heat carrier system 80. That is, the power generator side low-temperature heat carrier system 80 is branched from the compressor side low-temperature heat carrier system 70 between the second heat exchanger 71 and the low-pressure stage compressor main body friction heat generation section 72A and merges with the compressor side low-temperature heat carrier system 70 at the three-way valve 78.

In the low-temperature heat carrier system 60, a passage on a downstream side of the three-way valve 78 is branched into three. End portions of the branched passages are represented by A1 to A3 in FIG. 1. A1 to A3 are provided with valves 102, 111, and 112, respectively. Further, as shown in FIG. 1 and FIG. 2, the low-temperature heat carrier system 60 is provided with a passage 106, which connects between B on an upstream side and a heat carrier inlet A4 of the aftercooler 36, and then connects between a heat carrier outlet B4 of the aftercooler 36 and B4 of the turbine lubrication oil tank 86. The compressor side low-temperature heat carrier system 70 is connected to heat carrier inlets (A1 to A4 in FIG. 1) of the low-temperature heating units 21, 26, 29, and 36.

The valve 102 is provided between the three-way valve 78 and the intake preheater 21. The valve 102 is opened during the compression of the working fluid (including the time when both the compression of the working fluid and the power generation are performed) and when a heat recovery quantity by the low-temperature heat carrier is excess.

As shown in FIG. 1, in the low-temperature heat carrier system 60, a passage on an upstream side of the second heat exchanger 71 described below is branched into three. End portions of the branched passages are represented by B1 to B3. The low-temperature heat carrier system 70 is connected to heat carrier outlets (B1 to B3 in FIG. 1) of the low-temperature heating units 21, 26, and 29.

As shown in FIG. 2, the second heat exchanger 71 is a heat exchanger for exchanging heat in its inside between the cooling water passage in which the cooling water supplied from the outside flows and the low-temperature heat carrier (oil), from the low-temperature heating units 21, 26, and 29, of the compressor side low-temperature heat carrier system 70 and the power generator side low-temperature heat carrier system 80. In the second heat exchanger 71, the low-temperature heat carrier (oil) is cooled down by heat exchange with the cooling water so as to maintain a temperature of the low-temperature heat carrier (oil) flowing into the low-temperature heat generation sections 72A, 72B, 73, 74, 75A, and 75B at a constant level (40° C. in the present embodiment).

The low-pressure stage compressor main body friction heat generation section 72A constitutes the low-temperature heat generation section. The low-pressure stage compressor main body friction heat generation section 72A is a portion where heat is generated by friction of a bearing and a gear (compressor main body increasing gear) of the electric motor 34 and the compressor main body 22. The heat generated by the friction is a mechanical loss. An outer surface of the low-pressure stage compressor main body friction heat generation section 72A constitutes the low-temperature heat recovery unit.

The high-pressure stage compressor main body friction heat generation section 72B constitutes the low-temperature heat generation section. The high-pressure stage compressor main body friction heat generation section 72B is a portion where heat is generated by friction of a bearing and a gear (compressor main body increasing gear) of the electric motor 34 and the compressor main body 24. The heat generated by the friction is a mechanical loss. An outer surface of the high-pressure stage compressor main body friction heat generation section 72B constitutes the low-temperature heat recovery unit.

Figure 8:
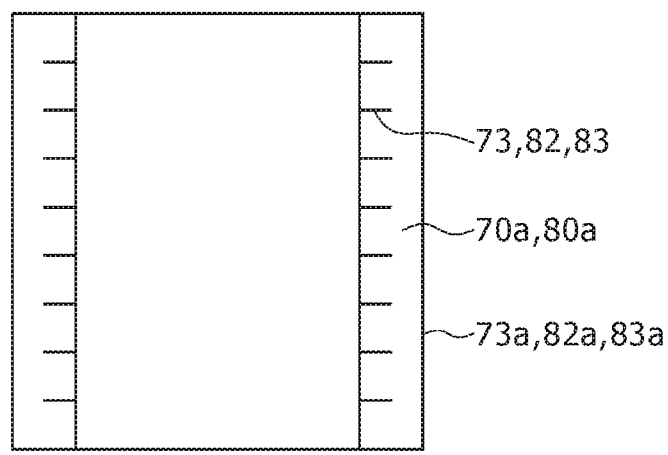
FIG. 8 is a simplified view of a casing of an inverter or a converter having a heat sink structure.

The inverter heat generation section 73 constitutes the low-temperature heat generation section. As shown in FIG. 8, the inverter heat generation section 73 is a heat sink provided in a casing 73a of the inverter having an IGBT element that controls a rotation speed of the electric motor 34. The heat sink of the casing 73a of the inverter is arranged adjacent to the oil circulation passage 70a of the low-temperature heat carrier system 70, through which the low-temperature heat carrier flows. In the heat sink, heat transferred from the inside of the casing 73a of the inverter and the low-temperature heat carrier (oil) in the oil circulation passage 70a exchange heat. The heat sink constitutes the low-temperature heat recovery unit.

Figure 9:
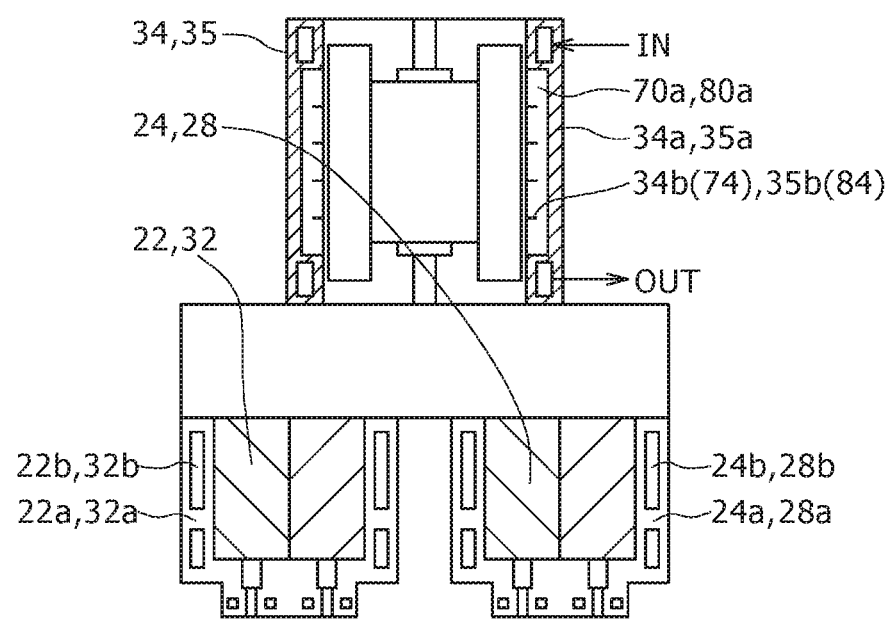
FIG. 9 is a plan view of a cooling jacket of a casing of an electric motor or a power generator main body.

The electric motor heat generation section 74 constitutes the low-temperature heat generation section. As shown in FIG. 9, the electric motor heat generation section 74 is a cooling jacket 34b provided in a casing 34a of the electric motor 34. The cooling jacket 34b of the casing 34a of the electric motor 34 is arranged to allow a flow of the low-temperature heat carrier (oil) in the oil circulation passage 70a in its inside. In the cooling jacket 34b, heat transferred from the inside of the casing 34a of the electric motor 34 and the low-temperature heat carrier (oil) in the oil circulation passage 70a exchange heat. The cooling jacket 34b constitutes the low-temperature heat recovery unit.

Figure 10:
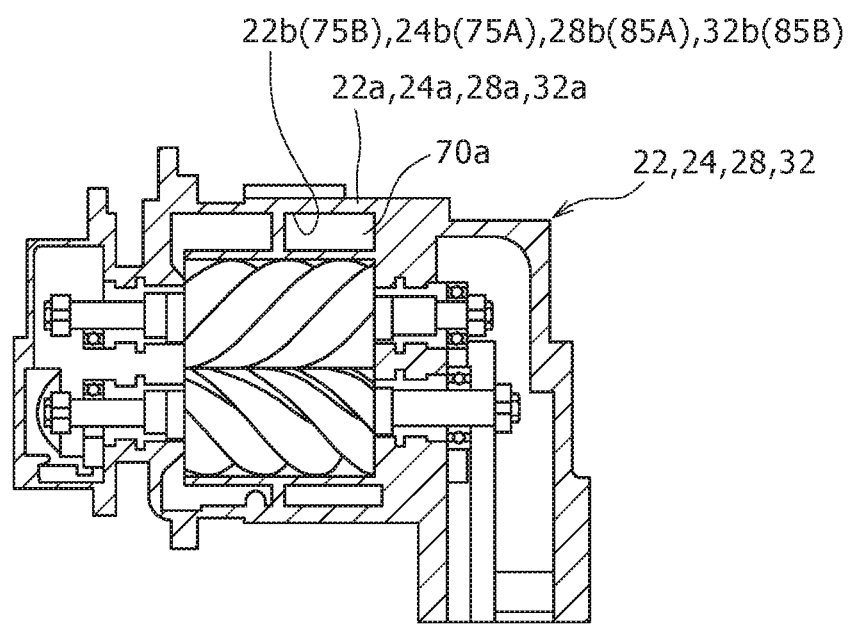
FIG. 10 is a sectional view of a cooling jacket of a casing of a compressor main body or an air turbine.

The high-pressure stage compressor main body casing heat generation section 75A constitutes the low-temperature heat generation section. As shown in FIG. 10, the high-pressure stage compressor main body casing heat generation section 75A is a cooling jacket 24b provided in a casing 24a of the high-pressure stage compressor main body 24. The cooling jacket 24b of the casing 24a of the high-pressure stage compressor main body 24 is arranged to allow a flow of the low-temperature heat carrier (oil) in the oil circulation passage 70a in its inside. In the cooling jacket 24b, heat transferred from the inside of the casing 24a of the high-pressure stage compressor main body 24 and the low-temperature heat carrier (oil) in the oil circulation passage 70a exchange heat. The cooling jacket 24b constitutes the low-temperature heat recovery unit.

The low-pressure stage compressor main body casing heat generation section 75B constitutes the low-temperature heat generation section. As shown in FIG. 10, the low-pressure stage compressor main body casing heat generation section 75B is a cooling jacket 22b provided in a casing 22a of the low-pressure stage compressor main body 22. The cooling jacket 22b of the casing 22a of the low-pressure stage compressor main body 22 is arranged to allow a flow of the low-temperature heat carrier (oil) in the oil circulation passage 70a in its inside. In the cooling jacket 22b, heat transferred from the inside of the casing 22a of the low-pressure stage compressor main body 22 and the low-temperature heat carrier (oil) in the oil circulation passage 70a exchange heat. The cooling jacket 22b constitutes the low-temperature heat recovery unit.

The compressor lubrication oil tank 76 stores the low-temperature heat carrier (oil) conveying the heat recovered by the respective low-temperature heat generation sections of the compressor side low-temperature heat carrier system 70. That is, the compressor lubrication oil tank 76 accumulates the heat recovered by the low-temperature heat generation sections 72A, 72B, 73, 74, 75A, and 75B of the compressor side low-temperature heat carrier system 70. In the present embodiment, a temperature of the low-temperature heat carrier (oil) accumulated in the compressor lubrication oil tank 76 is 75° C.

A communication passage 79 is provided between the compressor lubrication oil tank 76 and the turbine lubrication oil tank 86. The communication passage 79 is provided with a check valve 79a permitting only a flow from the compressor lubrication oil tank 76 to the turbine lubrication oil tank 86.

A rotation speed of the oil pump 77 is controlled by the control device (not illustrated) based on input power to the electric motor 34 and an oil temperature. The oil pump 77 is operated during the compression of the working fluid in the compressor 11, and feeds the low-temperature heat carrier (oil) from the compressor lubrication oil tank 76 to the low-temperature heating units 21, 26, and 29 via the three-way valve 78. The oil pump 77 is stopped after a fixed time from the completion of the compression of the working fluid.

The three-way valve 78 is a valve interconnecting one or both of the compressor side low-temperature heat carrier system 70 and the power generator side low-temperature heat carrier system 80, and a passage connected to the low-temperature heating units 21, 26, and 29. The three-way valve 78 opens a valve on a side of the compressor side low-temperature heat carrier system 70 and a valve on a side of the passage during the compression of the working fluid, while it opens a valve on a side of the power generator side low-temperature heat carrier system 80 and the valve on the side of the passage during the power generation.

As shown in FIG. 2, the power generator side low-temperature heat carrier system 80 is formed by sequentially arranging, along a flow of the low-temperature heat carrier, the second heat exchanger 71, a high-pressure stage turbine friction heat generation section 81A, a low-pressure stage turbine friction heat generation section 81B, a converter heat generation section 82, an inverter heat generation section 83, a power generator main body heat generation section 84, a high-pressure stage turbine casing heat generation section 85A, a low-pressure stage turbine casing heat generation section 85B, the turbine lubrication oil tank 86, the oil pump 87, and the three-way valve 78.

As described above, the second heat exchanger 71 is commonly used in the compressor side low-temperature heat carrier system 70.

The high-pressure stage turbine friction heat generation section 81A constitutes the low-temperature heat generation section. The high-pressure stage turbine friction heat generation section 81A is a portion where heat is generated by friction of a bearing and a gear of the power generator main body 35 and the expander 28. The heat generated by the friction is a mechanical loss. An outer surface of the high-pressure stage turbine friction heat generation section 81A constitutes the low-temperature heat recovery unit.

The low-pressure stage turbine friction heat generation unit 81B constitutes the low-temperature heat generation section. The low-pressure stage turbine friction heat generation unit 81B is a portion where heat is generated by friction of a bearing and a gear of the power generator main body 35 and the expander 32. The heat generated by the friction is a mechanical loss. An outer surface of the low-pressure stage turbine friction heat generation unit 81B constitutes the low-temperature heat recovery unit.

The converter heat generation section 82 constitutes the low-temperature heat generation section. As shown in FIG. 8, the converter heat generation section 82 is a heat sink provided in a casing 82a of the converter of the power generator main body 35. The heat sink of the casing 82a of the converter is arranged adjacent to the oil circulation passage 80a, through which the low-temperature heat carrier flows. In the heat sink, heat transferred from the inside of the casing 82a of the converter and the low-temperature heat carrier (oil) in the oil circulation passage 80a exchange heat. The heat sink constitutes the low-temperature heat recovery unit.

The inverter heat generation section 83 constitutes the low-temperature heat generation section. As shown in FIG. 8, the inverter heat generation section 83 is a heat sink provided in a casing 83a of the inverter for reconverting the generated power that has been converted by the converter. The heat sink of the casing 83a of the inverter is arranged adjacent to the oil circulation passage 70a, through which the low-temperature heat carrier flows. In the heat sink, heat transferred from the inside of the casing 83a of the inverter and the low-temperature heat carrier (oil) in the oil circulation passage 70a exchange heat. The heat sink constitutes the low-temperature heat recovery unit.

The power generator main body heat generation section 84 constitutes the low-temperature heat generation section. As shown in FIG. 9, the power generator main body heat generation section 84 is a cooling jacket 35b provided in a casing 35a of the power generator main body 35. The cooling jacket 35b of the casing 35a of the power generator main body 35 is arranged to allow a flow of the low-temperature heat carrier (oil) in the oil circulation passage 80a in its inside. In the cooling jacket 35b, heat transferred from the inside of the casing 35a of the power generator main body 35 and the low-temperature heat carrier (oil) in the oil circulation passage 80a exchange heat. The cooling jacket 35b constitutes the low-temperature heat recovery unit.

The high-pressure stage turbine casing heat generation section 85A constitutes the low-temperature heat generation section. As shown in FIG. 10, the high-pressure stage turbine casing heat generation section 85A is a cooling jacket 28b provided in a casing 28a of the high-pressure stage expander 28. The cooling jacket 28b of the casing 28a of the high-pressure stage expander 28 is arranged to allow a flow of the low-temperature heat carrier (oil) in the oil circulation passage 80a in its inside. In the cooling jacket 28b, heat transferred from the inside of the casing 28a of the high-pressure stage expander 28 and the low-temperature heat carrier (oil) in the oil circulation passage 80a exchange heat. The cooling jacket 28b constitutes the low-temperature heat recovery unit.

The low-pressure stage turbine casing heat generation section 85B constitutes the low-temperature heat generation section. As shown in FIG. 10, the low-pressure stage turbine casing heat generation section 85B is a cooling jacket 32b provided in a casing 32a of the low-pressure stage expander 32. The cooling jacket 32b of the casing 32a of the low-pressure stage expander 32 is arranged to allow a flow of the low-temperature heat carrier (oil) in the oil circulation passage 80a in its inside. In the cooling jacket 32b, heat transferred from the inside of the casing 32a of the low-pressure stage expander 32 and the low-temperature heat carrier (oil) in the oil circulation passage 80a exchange heat. The cooling jacket 32b constitutes the low-temperature heat recovery unit.

The turbine lubrication oil tank 86 stores the low-temperature heat carrier (oil) conveying the heat recovered by the respective low-temperature heat generation sections of the power generator side low-temperature heat carrier system 80. That is, the turbine lubrication oil tank 86 accumulates the heat recovered by the low-temperature heat generation sections 81A, 81B, 82, 83, 84, 85A, and 85B of the power generator side low-temperature heat carrier system 80. In the present embodiment, a temperature of the low-temperature heat carrier (oil) accumulated in the turbine lubrication oil tank 86 is 81° C. The turbine lubrication oil tank 86 is provided with a passage into which the low-temperature heat carrier flows from a heat carrier outlet of the aftercooler 36 via B4. The turbine lubrication oil tank 86 is provided with the oil level sensor 108 to detect an oil level. When the oil level sensor 108 detects that the oil level of the turbine lubrication oil tank 86 reaches a predetermined lower limit, the valve 105 of the bypass passage 104 is opened by the control device (not illustrated).

A rotation speed of the oil pump 87 is controlled by the control device (not illustrated) based on the generated power of the power generator 13 and an oil temperature. The oil pump 87 is operated during the power generation of the power generator 13 and feeds the low-temperature heat carrier (oil) from the turbine lubrication oil tank 86 to the low-temperature heating units 21, 26, and 29 via the three-way valve 78. The oil pump 87 is stopped after a fixed time from the completion of the power generation.

As described above, the three-way valve 78 is commonly used in the compressor side low-temperature heat carrier system 70.

Operations of the compressed fluid storage power generation device 10 having the above configurations will now be described.

Referring to FIG. 1, the electric motor 34 is operated by the control device (not illustrated) based on an oil temperature or input power during the compression of the working fluid, which in turn drives the low-pressure stage compressor main body 22 and the high-pressure stage compressor main body 24. An inlet valve (not illustrated) of the pressure accumulation tank 12 is opened. The heat carrier supply pump 41 is operated and then the oil pump 77 of the compressor side low-temperature heat carrier system 70 is operated. The three-way valve is opened so as to communicate the compressor side low-temperature heat carrier system 70.

As the low-pressure stage compressor main body 22 is driven, the low-pressure stage compressor main body 22 sucks air from the outside via the intake preheater 21. During this process, in the intake preheater 21, the air is heated (compressed air temperature: 70° C.) by heat exchange with the low-temperature heat carrier (oil) fed from the compressor lubrication oil tank 76 by the oil pump 77 via the oil circulation passage 70a. The air sucked into the low-pressure stage compressor main body 22 is compressed by the low-pressure stage compressor main body 22 and fed to the air inlet 23a of the intercooler 23 (compressed air temperature: 176 to 210° C.).

The compressed air flowing in from the air inlet 23a of the intercooler 23 is cooled down (compressed air temperature: 115° C.) inside the intercooler 23 by heat exchange with the first high-temperature heat carrier (oil) fed by the heat carrier supply pump 41. The compressed air then flows out from the air outlet 23b and is fed to the high-pressure stage compressor main body 24. It is noted that the first high-temperature heat carrier (oil) fed to the intercooler 23 by the heat carrier supply pump 41 has been cooled down by heat exchange with the cooling water in the cooling water passage when passing through the first heat exchanger 45. The first high-temperature heat carrier (oil) is heated (165° C. to 200° C.) by recovering heat from the compressed air in the intercooler 23 and stored in the first heat carrier tank 42 for heat accumulation.

In the high-pressure stage compressor main body 24, the compressed air from the intercooler 23 is compressed and brought into a higher temperature and higher pressure condition than the compressed air on a discharge side of the low-pressure stage compressor main body 22, and then discharged (compressed air temperature and pressure: 250° C. and 0.6 MPa). The compressed air discharged from the high-pressure stage compressor main body 24 is fed to the aftercooler 25.

The compressed air flowing in from the air inlet 25a of the aftercooler 25 is cooled down (compressed air temperature: 90° C.) inside the aftercooler 25 by heat exchange with the second high-temperature heat carrier (oil) of the second high-temperature heat carrier system 50 fed by the heat carrier supply pump 41. The compressed air then flows out from the air outlet 25b and is fed to the pressure accumulation tank 12. The pressure accumulation tank 12 is supplied with the compressed air compressed by the compressor 11 during the compression of the working fluid. In the compressed fluid storage power generation device 10, the inlet valve (not illustrated) and the outlet valve (not illustrated) of the pressure accumulation tank 12 are closed to store the compressed air for pressure accumulation after the completion of the compression of the working fluid until the power generation is performed. The second high-temperature heat carrier (oil) is heated up to 240° C. by recovering heat from the compressed air in the aftercooler 25 and stored in the second heat carrier tank 51 for heat accumulation. The electric motor 34 is stopped and then the low-pressure stage compressor main body 22 and the high-pressure stage compressor main body 24 are stopped. The inlet valve (not illustrated) of the pressure accumulation tank 12 is closed. The heat carrier supply pump 41 is stopped, and the oil pump 77 of the compressor side low-temperature heat carrier system 70 is stopped after a fixed time passes. The compressed air in the pressure accumulation tank 12 is cooled down to the atmospheric temperature of 30° C. by heat radiation.

On the other hand, in the compressor side low-temperature heat carrier system 70 of the compressor 11, the low-temperature heat carrier is fed from the compressor lubrication oil tank (low-temperature heat accumulation unit) 76 to the intake preheater 21 via the three-way valve 78 by the operation of the oil pump 77 and the opening of the valve 102. The low-temperature heat carrier is prevented from flowing into the loss recovery heat preheater (second low-temperature preheater) 26 and the recovery heat interheater (third low-temperature preheater) 29 by the closing of the valves 111 and 112. In this state, the low-temperature heat carrier has excess recovery heat, thus the valve 102 is opened. In the intake preheater 21, the air being sucked into the low-pressure stage compressor main body 22 exchanges heat with the low-temperature heat carrier of the compressor side low-temperature heat carrier system 70. By this process, the air is heated and the low-temperature heat carrier is cooled down.

Subsequently, the low-temperature heat carrier (oil) in the oil circulation passage 70a cooled down by the intake preheater 21 flows into the second heat exchanger 71 via B1 and B, and is cooled down in the second heat exchanger 71 by heat exchange with the cooling water of the cooling water passage. The low-temperature heat carrier (oil) then passes through the second heat exchanger 71 and recovers heat from the bearing and the gear having friction heat generated by rotation in the low-pressure stage compressor main body friction heat generation section 72A and the high-pressure stage compressor main body friction heat generation section 72B. After recovering the heat from the bearing and the gear in the low-pressure stage compressor main body friction heat generation section 72A and the high-pressure stage compressor main body friction heat generation section 72B, the low-temperature heat carrier (oil) exchanges heat with the casing 73a of the inverter when passing through the heat sink, which is the inverter heat generation section 73 shown in FIG. 8. The low-temperature heat carrier (oil) then flows into the cooling jacket 34b of the casing 34a of the electric motor 34 shown in FIG. 9 in the electric motor heat generation section 74, and recovers heat from the casing 34a of the electric motor 34 via the cooling jacket 34b. The low-temperature heat carrier (oil) then flows into the cooling jackets 22b and 24b of the casings 22a and 24a of the compressor main bodies 22 and 24, which are the high-pressure stage compressor main body casing heat generation section 75A and the low-pressure stage compressor main body casing heat generation section 75B, respectively, and recovers heat from the casings 22a and 24a of the compressor main bodies 22 and 24 via the cooling jackets 22b and 24b. After recovering the heat from the casings 22a and 24a of the compressor main bodies 22 and 24, the low-temperature heat carrier (oil) flows into the compressor lubrication oil tank 76 and is stored therein. That is, the heat of the low-temperature heat carrier (oil) is accumulated by storing the low-temperature heat carrier (oil) in the compressor lubrication oil tank 76. The low-temperature heat carrier (oil) circulates in the compressor side low-temperature heat carrier system 70. After the compression of the working fluid is completed, the oil pump 77 is stopped after a fixed time passes and the circulation of the low-temperature heat carrier is terminated.

During the power generation, an outlet valve (not illustrated) of the pressure accumulation tank 12 is opened by a rotation speed control of the control device (not illustrated) according to generated power to be sent to a system, and the compressed air is supplied from the pressure accumulation tank 12 to the power generator 13 (compressed air temperature: 30° C.). The first heat carrier recovery pump 43 is operated and then the second heat carrier recovery pump 52 is operated. The oil pump 87 of the power generator side low-temperature heat carrier system 80 is operated. The three-way valve 78 is opened so as to communicate the power generator side low-temperature heat carrier system 80.

The compressed air flowing from the pressure accumulation tank 12 by the opening of the outlet valve (not illustrated) of the pressure accumulation tank 12 is fed to the loss recovery heat preheater 26. In the loss recovery heat preheater 26, the compressed air is heated by heat exchange with the low-temperature heat carrier (oil) fed from the turbine lubrication oil tank 86 by the oil pump 87 via the oil circulation passage 80a of the power generator side low-temperature heat carrier system 80. On the other hand, the low-temperature heat carrier (oil) is cooled down and flows into the low-temperature heat generation sections of the power generator side low-temperature heat carrier system 80. The compressed air heated by the loss recovery heat preheater 26 is fed to the preheater 27 (compressed air temperature: 70° C.).

In the preheater 27, the compressed air is heated (compressed air temperature: 155° C.) by heat exchange with the first high-temperature heat carrier (oil) of the first high-temperature heat carrier system 40 flowing by the operation of the first heat carrier recovery pump 43. On the other hand, the first high-temperature heat carrier (oil) is cooled down and flows into the heat carrier return tank 44. The compressed air heated by the preheater 27 is fed to the high-pressure stage expander 28.

The high-pressure stage expander 28 is driven by the compressed air fed from the preheater 27, which in turn drives the power generator main body 35. The power generator 13 generates power by the driving of the power generator main body 35 and the generated power is sent to a system not illustrated. The compressed air having passed through the high-pressure stage expander 28 is fed to the loss recovery heat interheater 29 (compressed air temperature and pressure: 25° C. and 0.2 MPa).

In the loss recovery heat interheater 29, the compressed air is heated by heat exchange with the low-temperature heat carrier (oil) fed from the turbine lubrication oil tank 86 by the oil pump 87 via the oil circulation passage 80a of the power generator side low-temperature heat carrier system 80. On the other hand, the low-temperature heat carrier (oil) is cooled down and flows into the low-temperature heat generation sections of the power generator side low-temperature heat carrier system 80 via B3 and B. The compressed air heated in the loss recovery heat interheater 29 is fed to the interheater 31 (compressed air temperature: 71° C.).

In the interheater 31, the compressed air is heated by heat exchange with the second high-temperature heat carrier (oil) of the second high-temperature heat carrier system 50 flowing by the operation of the second heat carrier recovery pump 52. On the other hand, the second high-temperature heat carrier (oil) is cooled down (oil temperature: 80° C.) and flows into the heat carrier return tank 44. The compressed air heated by the interheater 31 is fed to the low-pressure stage expander 32 (compressed air temperature: 230° C.).

The low-pressure stage expander 32 is driven by the compressed air fed from the interheater 31, which in turn drives the power generator main body 35. The power generator 13 generates power by the driving of the power generator main body 35 and the generated power is sent to a system not illustrated. The compressed air having passed through the low-pressure stage expander 32 flows into the aftercooler 36.

In the aftercooler 36, the compressed air is cooled down by heat exchange with the low-temperature heat carrier (oil) flowing in from B via A4, and discharged to the atmosphere at a temperature of about 45° C. On the other hand, the low-temperature heat carrier (oil) is heated by heat exchange with the compressed air. The low-temperature heat carrier (oil) heated to about 80° C. is returned to the turbine lubrication oil tank 86 via B4 (See FIG. 1 and FIG. 2).

On the other hand, in the power generator side low-temperature heat carrier system 80 of the power generator 13, the low-temperature heat carrier is fed from the turbine lubrication oil tank (low-temperature heat accumulation unit) 86 by the operation of the oil pump 87 and the opening of the valves 111 and 112, and flows into the loss recovery heat preheater (second low-temperature preheater) 26 and the recovery heat interheater (third low-temperature preheater) 29 via the three-way valve 78. Both in the loss recovery heat preheater 26 and in the recovery heat interheater 29, the compressed air is heated and the low-temperature heat carrier is cooled down. It is noted that the low-temperature heat carrier is prevented from flowing into the intake preheater (first low-temperature preheater) 21 by the closing of the valve 102.

Subsequently, the low-temperature heat carrier (oil), in the oil circulation passage 80a cooled down by the loss recovery heat preheater 26 and the recovery heat interheater 29, flows into the second heat exchanger 71 via B2 and B3 and is cooled down in the second heat exchanger 71 by heat exchange with the cooling water in the cooling water passage. The low-temperature heat carrier (oil) then passes through the second heat exchanger 71 and recovers heat from a bearing and a gear having friction heat generated by rotation in the high-pressure stage turbine friction heat generation section 81A and the low-pressure stage turbine friction heat generation section 81B. This low-temperature heat carrier (oil) exchanges heat with the casing 82a of the converter heat generation section 82 and the casing 83a of the inverter heat generation section 83 when passing through the heat sink serving as the converter heat generation section 82 and the heat sink serving as the inverter heat generation section 83 shown in FIG. 8.

The low-temperature heat carrier (oil) then flows into the cooling jacket 35b of the casing 35a of the power generator main body 35 shown in FIG. 9, and recovers heat from the casing 35*a* of the power generator main body 35 via the cooling jacket 35*b* in the power generator main body heat generation section 84. The low-temperature heat carrier (oil) then flows into the cooling jackets 28*b* and 32*b* of the casings 28*a* and 32*a* of the expanders 28 and 32, serving as the high-pressure stage turbine casing heat generation section 85A and the low-pressure stage turbine casing heat generation section 85B, respectively, and recovers heat from the casings 28*a* and 32*a* of the expanders 28 and 32 via the cooling jackets 28*b* and 32*b*. After recovering the heat from the casings 28*a* and 32*a* of the expanders 28 and 32, the low-temperature heat carrier (oil) flows into the turbine lubrication oil tank 86 and is stored therein. That is, the heat of the low-temperature heat carrier (oil) recovered by the low-temperature heat recovery units is accumulated by storing the low-temperature heat carrier (oil) in the turbine lubrication oil tank 86. The low-temperature heat carrier (oil) circulates in the power generator side low-temperature heat carrier system 80. After the power generation is completed, the oil pump 87 is stopped after a fixed time passes and the circulation of the low-temperature heat carrier is terminated.

In the above descriptions, operations during the compression of the working fluid and operations during the power generation are described separately, however, operations of the compression of the working fluid and operations of the power generation may be simultaneously performed.

When the oil level sensor 108 detects that the oil level of the turbine lubrication oil tank 86 reaches a predetermined lower limit, the valve 105 of the bypass passage 104 is opened by the control device (not illustrated) in any of the following cases: the compression of the working fluid only is performed; the power generation only is performed; the compression of the working fluid and the power generation are both performed; and the compression of the working fluid and the power generation are both suspended.

According to the present invention, the heat is recovered from the compressed air flowing into the pressure accumulation tank 12 by the intercooler 23 and aftercooler 25, and then this heat can be used for heating the compressed air flowing from the pressure accumulation tank 12 into the expanders 28 and 42 by the preheater 27 and the interheater 31. Thus, heat efficiency can be improved. Further, the heat is recovered by the low-temperature heat recovery units from the low-temperature heat generation sections 36, 72A, 72B, 73, 74, 75A, 75B, 77, 81A, 81B, 82, 83, 84, 85A, 85B, and 87 in at least one of the compressor 11 and the power generator 13, and this heat can be used for heating the compressed air by the intake preheater 21, the loss recovery heat preheater 26, and the loss recovery heat interheater 29. Thus, heat efficiency can be further improved. As a result, improvement of the power generation efficiency can be realized in the compressed fluid storage power generation device 10 by reusing the heat from the low-temperature heat sources. That is, the power generation efficiency can be improved in the compressed fluid storage power generation device 10 by minimizing the heat exhausted in the low-temperature heat generation sections 36, 72A, 72B, 73, 74, 75A, 75B, 77, 81A, 81B, 82, 83, 84, 85A, 85B, and 87 without being used for power generation and thereby improving the heat efficiency.

According to the above configurations, the device can be used in charging variable power and transmitting variable power in a required amount. That is, the device can smooth the output of variable power generated by solar power and wind power serving as renewable energy.

The device comprises the oil circulation passages 70*a* and 80*a* for circulating oil between the compressor side low-temperature heat carrier system 70 and the power generator side low-temperature heat carrier system 80, and the intake preheater 21, the loss recovery heat preheater 26, and the loss recovery heat interheater 29. In this manner, the heat of the heat generation sections 72A, 72B, 73, 74, 75A, 75B, and 77 in the compressor 11 and the heat of the heat generation sections 36, 81A, 81B, 82, 83, 84, 85A, 85B, and 87 in the power generator 13 can be reliably recovered via the oil in the oil circulation passages 70*a* and 80*a*. Further, the compressed air of which temperature is dropped near the atmospheric temperature during a process of the power generation can be heated to a higher temperature, for example, about 70° C. by the recovery heat of an electric loss, a heat radiation loss, and a mechanical loss, thereby enabling to increase enthalpy held by the compressed air. As a result, a heat quantity can be increased more than an A-CAES system, in which reheating is performed only by accumulated compression heat, thereby allowing the device of the present invention to perform further more expansion work in the air turbine and obtain further higher charge/discharge efficiency.

The low-temperature heat generation sections of the low-temperature heat recovery units are friction heat generation sections (bearing friction heat generation sections and gear friction heat generation sections) in which friction heat is generated in a rotating part of the compressor main body, the expanders 28 and 32, the electric motor 34, and the power generator main body 35. By providing the low-temperature heat recovery units 72A, 72B, 73, 74, 75A, 75B, 77, 81A, 81B, 82, 83, 84, 85A, 85B, and 87, exhaust heat discharged into the atmosphere as friction heat from the compressor main bodies 22 and 24, the expanders 28 and 33, the electric motor 34, and the power generator main body 35 can be recovered, thus the heat efficiency can be improved.

A drive source is the electric motor 34 having the inverter that controls a rotation speed. The heat generation section includes the electric motor heat generation section 74, a portion where heat is generated in the electric motor 34, and the inverter heat generation section 73, a portion where heat is generated in the inverter. Thus, exhaust heat discharged into the atmosphere from the casing 34*a* of the electric motor 34 and the casing 73*a* of the inverter can be recovered to improve the heat efficiency.

The low-temperature heat carrier (oil) flows into the cooling jackets 22*b* and 24*b* of the casings 22*a* and 24*a* of the compressor main bodies 22 and 24, and can recover heat from the casings 22*a* and 24*a* of the compressor main bodies 22 and 24 via the cooling jackets 22*b* and 24*b*.

The low-temperature heat carrier (oil) flows into the cooling jacket 35*b* of the casing 35*a* of the power generator main body 35, and can recover heat from the casing 35*a* of the power generator main body 35 via the cooling jacket 35*b*.

The device comprises the converter for converting the power generated in the power generator main body 35 and the inverter for reconverting the converted power that has been converted by the converter. Further, the low-temperature heat generation sections include the power generator main body heat generation section 84, a portion where heat is generated in the power generator main body 35, the converter heat generation section 82, a portion where heat is generated in the converter, and the inverter heat generation section 83, a portion where heat is generated in the inverter. Thus, exhaust heat discharged into the atmosphere from the power generator main body 35, the converter, and the inverter can be recovered to improve the heat efficiency.

The low-temperature heat carrier (oil) flows into the cooling jackets 28b and 32b of the casings 28a and 32a of the expanders 28 and 32, and can recover heat from the casings 28a and 32a of the expanders 28 and 32 via the cooling jackets 28b and 32b.

The inverter heat generation section 73 is the casing 73a of the inverter and the compressor side low-temperature heat carrier system 70 comprises the heat sink provided in the casing 73a of the inverter. In this manner, heat of the casing 73a of the inverter can be recovered via the heat sink to improve the heat efficiency.

The converter heat generation section 82 is the casing 82a of the converter and the inverter heat generation section 83 is the casing 83a of the inverter, and the power generator side low-temperature heat carrier system 80 comprises the heat sinks provided in the casing 82a of the converter and the casing 83a of the inverter. In this manner, heat of the casings 82a and 83a of the converter and the inverter can be recovered via the heat sinks to improve the heat efficiency.

The compressor main bodies 22 and 24 comprise the low-pressure stage compressor main body 22 and the high-pressure stage compressor main body 24, and the expanders 28 and 32 comprise the high-pressure stage expander 28 and the low-pressure stage expander 32. The low-temperature heating unit comprises at least one of the first low-temperature preheater 21, the second low-temperature preheater 26, and the third low-temperature preheater 29. According to this configuration, drive force of the high-pressure stage expander 28 and the low-pressure stage expander 32 can be increased. In this manner, the power generation efficiency can be improved.

The device comprises the first heat carrier tank 42, the second heat carrier tank 51, and the low-temperature heat accumulation units 76 and 86, thus the heat carriers having three different temperatures can be used appropriately as a heating source. In this manner, the power generation efficiency can be improved.

Heat of a power generation loss, a power generation inverter loss, and a converter loss is recovered by lubrication oil cooling structures. Heat of all generated power losses resulting from power consumption of the lubrication oil pumps is recovered to increase a lubrication oil temperature. The recovered heat can be used for reheating the air being supplied to the air turbines.

An impact on charge/discharge efficiency caused by an electric loss is more than 20% to the whole efficiency, thus performing the heat recovery can largely improve the charge/discharge efficiency. An impact of a mechanical loss to the charge/discharge efficiency is 5 to 10%, depending on the type of devices. An impact of a heat radiation loss to the charge/discharge efficiency is about 5%. By recovering these low-temperature heat losses and utilizing them for preheating the air being supplied to the turbines, the charge/discharge efficiency can be improved by up to about 30%.

It is noted that, in the present invention, the lubrication oil or the cooling water as a liquid is used as the low-temperature heat carrier, a temperature differences throughout the casings 22a, 24a and 35a can be reduced. As a result, deformations of the casings 22a, 24a and 35a due to such temperature differences arisen inside the casings 22a, 24a and 35a of the compressor main bodies 22 and 24 and the power generator main body 35 can be avoided.

Heat generation temperatures differ depending on the heat generation sections where heat is recovered. Heat accumulation is performed using the lubrication oil up to approximately 80° C. Further, the low-pressure stage air compressor 22 reaches to a temperature range of approximately 160° C. without heating intake air. A high-pressure stage discharge temperature can be increased up to approximately 250° C. by adjusting a cooling degree of the intercooler. Three heat accumulation tanks 42, 51, and 76 (86) are employed depending on the temperature ranges. In this manner, the different heating sources are appropriately used depending on required temperature conditions for heating the air being supplied to the air turbine power generation and for heating the intermediate exhaust air, thus the power generation efficiency can be improved.

Second Embodiment

Figure 11:
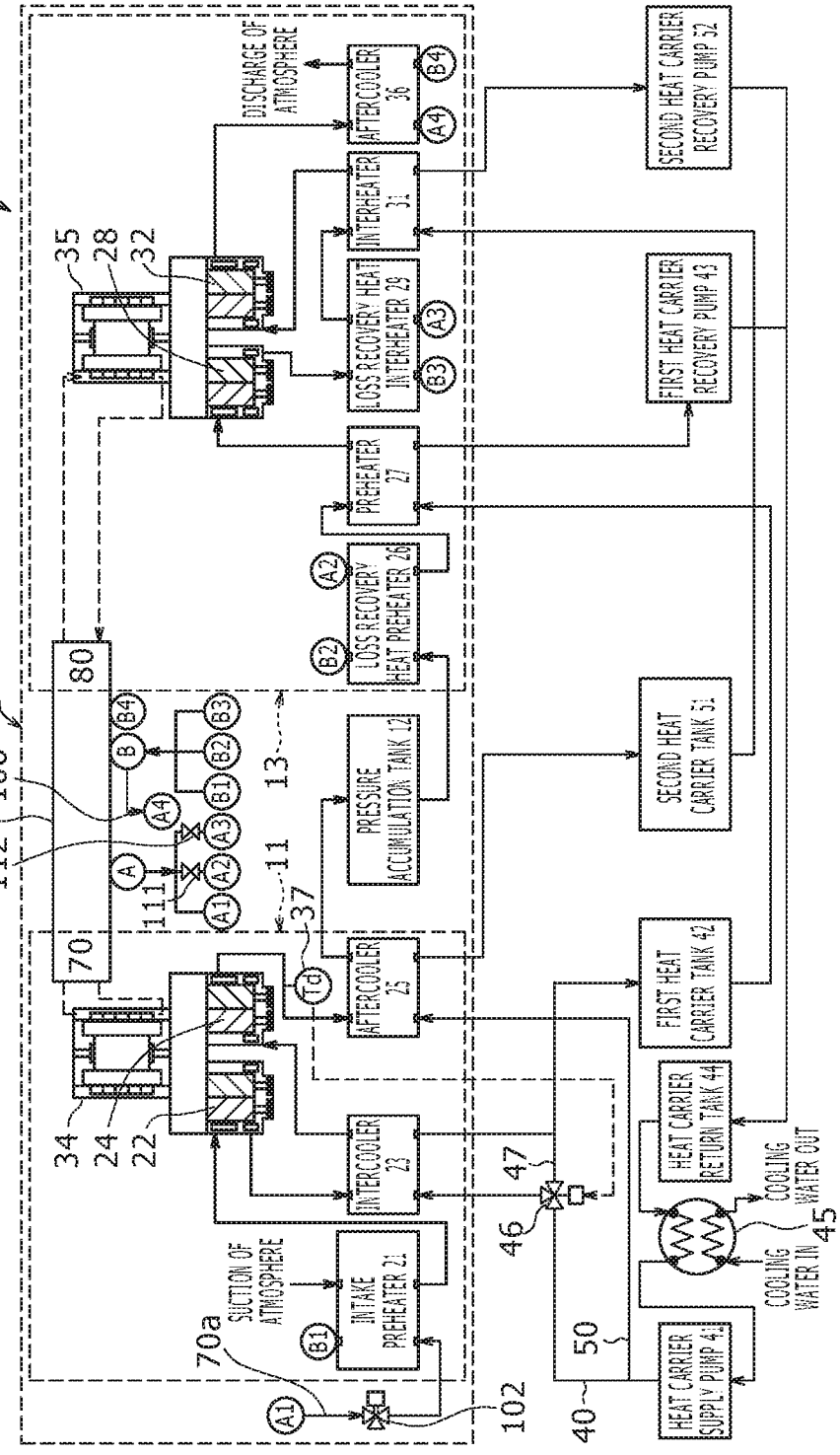
FIG. 11 is a schematic diagram of a compressed fluid storage power generation device according to a second embodiment of the present invention.
Figure 12:
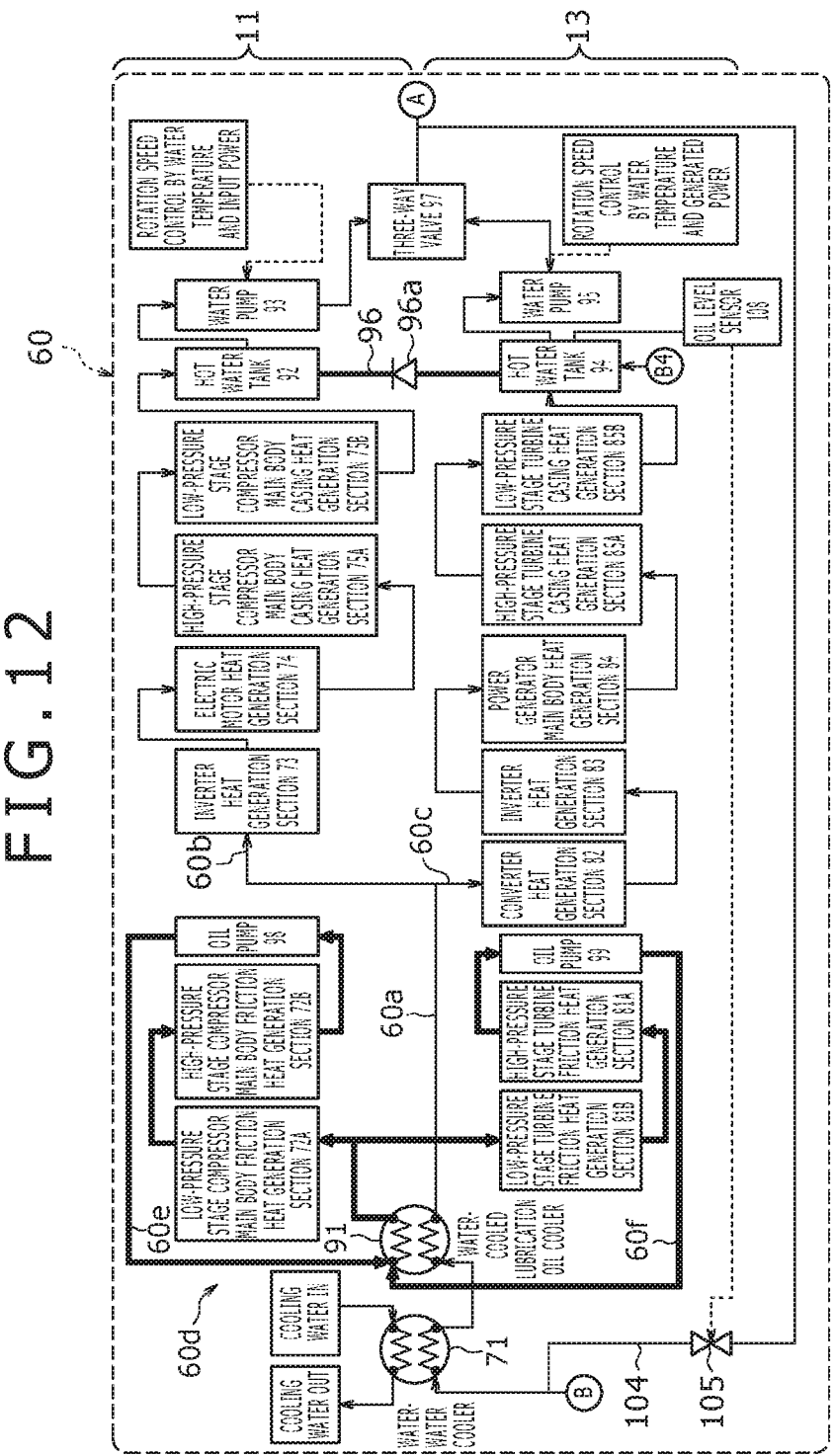
FIG. 12 is a diagram showing a low-temperature heat carrier system in the compressed fluid storage power generation device according to the second embodiment.

FIG. 11 shows a compressed fluid storage power generation device 10 according to a second embodiment of the present invention. FIG. 12 shows a low-temperature heat carrier system 60 of the compressed fluid storage power generation device 10 according to the second embodiment of the present invention. Configurations of the second embodiment are substantially identical to those of the first embodiment except the low-temperature heat recovery units in which cooling water is used as the low-temperature heat carrier and the low-temperature heat carrier system 60.

The low-temperature heat carrier system 60 comprises a cooling water system 60a for recovering heat of the low-temperature heat generation sections using cooling water, and a lubrication oil system 60d for recovering heat of the low-temperature heat generation sections using lubrication oil.

The cooling water system 60a is a water circulation passage, in which the cooling water flows through the low-temperature heat recovery units and the low-temperature heating units 21, 26, 29, and 36. The cooling water system 60a is branched at its intermediate portion into a compressor side cooling water system 60b connecting to a three-way valve 97 via the compressor 11, and a power generator side cooling water system 60c connecting to a three-way valve 97 via the power generator 13.

The compressor side cooling water system 60b is formed by sequentially arranging the second heat exchanger 71, a third heat exchanger (oil/water heat exchanger) 91, the inverter heat generation section 73, the electric motor heat generation section 74, the high-pressure stage compressor main body casing heat generation section 75A, the low-pressure stage compressor main body casing heat generation section 75B, a hot water tank 92, a water pump 93, and the three-way valve 97. The low-temperature heat generation sections of the compressor side cooling water system 60b includes the inverter heat generation section 73, the electric motor heat generation section 74, the high-pressure stage compressor main body casing heat generation section 75A, the low-pressure stage compressor main body casing heat generation section 75B, and the water pump 93. The inverter heat generation section 73, the electric motor heat generation section 74, the high-pressure stage compressor main body casing heat generation section 75A, and the low-pressure stage compressor main body casing heat generation section 75B in the present embodiment are identical to those in the first embodiment.

The second heat exchanger 71 is identical to that in the first embodiment.

The third heat exchanger (oil/water heat exchanger) 91 performs heat exchange between the cooling water of the cooling water system 60a and the lubrication oil of the lubrication oil system 60d.

The hot water tank 92 corresponds to the compressor lubrication oil tank 76 in the first embodiment.

The water pump 93 corresponds to the oil pump 77 in the first embodiment.

The three-way valve 97 is identical to the three-way valve 78 in the first embodiment.

The power generator side cooling water system 60c is formed by sequentially arranging the second heat exchanger 71, the third heat exchanger (oil/water heat exchanger) 91, the converter heat generation section 82, the inverter heat generation section 83, the power generator main body heat generation section 84, the high-pressure stage turbine casing heat generation section 85A, the low-pressure stage turbine casing heat generation section 85B, a hot water tank 94, a water pump 95, and the three-way valve 97. The low-temperature heat generation sections of the power generator side cooling water system 60c include the converter heat generation section 82, the inverter heat generation section 83, the power generator main body heat generation section 84, the high-pressure stage turbine casing heat generation section 85A, and the low-pressure stage turbine casing heat generation section 85B. The converter heat generation section 82, the inverter heat generation section 83, the power generator main body heat generation section 84, the high-pressure stage turbine casing heat generation section 85A, and the low-pressure stage turbine casing heat generation section 85B in the present embodiment are identical to those in the first embodiment.

The second heat exchanger 71 is commonly used in the compressor side cooling water system 60b.

The third heat exchanger (oil/water heat exchanger) 91 is commonly used in the compressor side cooling water system 60b.

The hot water tank 94 corresponds to the turbine lubrication oil tank 86 in the first embodiment.

The water pump 95 corresponds to the oil pump 87 in the first embodiment.

The lubrication oil system 60d is an oil circulation passage in which oil flows through the low-temperature heat generation sections 72A, 72B, 81A, 81B, 98 and 99 of the lubrication oil system 60d. The lubrication oil system 60d comprises a compressor side lubrication oil system 60e and a power generator side lubrication oil system 60f. The compressor side lubrication oil system 60e and the power generator side lubrication oil system 60f are connected to a passage inlet and a passage outlet of the third heat exchanger (oil/water heat exchanger) 91, respectively. That is, the oil of the lubrication oil system 60d circulates both in the compressor side lubrication oil system 60e and in the power generator side lubrication oil system 60f.

The compressor side lubrication oil system 60e is formed by sequentially arranging the third heat exchanger (oil/water heat exchanger) 91, the low-pressure stage compressor main body friction heat generation section 72A, the high-pressure stage compressor main body friction heat generation section 72B, and the oil pump 98. The low-pressure stage compressor main body friction heat generation section 72A and the high-pressure stage compressor main body friction heat generation section 72B in the present embodiment are identical to those in the first embodiment. The third heat exchanger (oil/water heat exchanger) 91 is commonly used in the cooling water system 60a. The oil pump 98 is operated during the compression of the working fluid in the compressor 11 to circulate the oil of the compressor side lubrication oil system 60e.

The power generator side lubrication oil system 60f is formed by sequentially arranging the third heat exchanger (oil/water heat exchanger) 91, the low-pressure stage turbine friction heat generation section 81B, the high-pressure stage turbine friction heat generation section 81A, and the oil pump 99. The low-pressure stage turbine friction heat generation section 81B and the high-pressure stage turbine friction heat generation section 81A in the present embodiment are identical to those in the first embodiment. The third heat exchanger (oil/water heat exchanger) 91 is commonly used in the cooling water system 60a. The oil pump 99 is operated during the power generation of the power generator 13 to circulate the oil of the power generator side lubrication oil system 60f.

During the compression of the working fluid in the compressor 11, the oil pump 98 is controlled in rotational speed by the control device (not illustrated) in proportion to the input power to the electric motor. The oil pump 98 of the compressor side lubrication oil system 60e is operated by a rotation speed control according to the input power of the electric motor. By this operation, heat is recovered from the low-temperature heat generation sections 72A and 72B by the circulation of the lubrication oil in the compressor side lubrication oil system 60e. Further, heat is recovered with the lubrication oil from the oil pump 98.

On the other hand, in the water circulation passage 60a of the low-temperature heat carrier system 60, the valve 102 is opened and the cooling water flows in from the intake preheater 21, thus the cooling water in the water circulation passage 60a is cooled by heat exchange in the second heat exchanger 71 with the cooling water externally supplied from the cooling water passage. The cooling water having passed through the second heat exchanger 71 is heated by heat exchange in the third heat exchanger 91 with the lubrication oil, which has already recovered the heat in the lubrication oil system 60e. During this process, the oil of the lubrication oil system 60e is cooled down and flows out from the third heat exchanger 91. In the third heat exchanger 91, the heat recovered by the oil system low-temperature heat recovery units 72A, 72B, and 98 via the oil of the oil circulation passage 60e is transferred to the water of the water circulation passage 60a for recovery.

The water having passed through the third heat exchanger 91 recovers heat while passing through the low-temperature heat recovery units of the compressor side cooling water system 60b and is stored in the hot water tank (low-temperature heat accumulation unit) 92 for heat accumulation. The water in the hot water tank 92 is fed to the intake preheater 21 via the three-way valve 97 by the operation of the water pump 93. It is noted that power generation is not performed by driving the high-pressure expander 28 and the low-pressure stage expander 32, thus the low-temperature heat carrier is prevented from flowing into the loss recovery heat preheater 26 and the loss recovery heat interheater 29 by closing the valves 111 and 112. In this state, the low-temperature heat carrier has excess recovered heat. Thus, as described above, the valve 102 is opened and the low-temperature heat carrier is fed to the intake preheater (first low-temperature preheater) 21. In the intake preheater 21, the air being sucked into the low-pressure stage compressor main body 22 exchanges heat with the low-temperature heat carrier of the compressor side low-temperature heat carrier system 70. By this process, the air is heated and the low-temperature heat carrier is cooled down.

During the power generation of the power generator 13, in the lubrication oil system 60d of the low-temperature heat carrier system 60, heat is recovered by the lubrication oil from the low-pressure stage turbine friction heat generation section 81B and the high-pressure stage turbine friction heat generation section 81A. Further, heat is recovered with the lubrication oil from the oil pump 99.

On the other hand, in the water circulation passage 60*a* of the low-temperature heat carrier system 60, the valves 111 and 112 are opened and the cooling water flows in from the loss recovery heat preheater 26 and the loss recovery heat interheater 29, thus the cooling water in the water circulation passage 60*a* is cooled by heat exchange in the second heat exchanger 71 with the cooling water externally supplied from the cooling water passage. The cooling water having passed through the second heat exchanger 71 is heated by heat exchange in the third heat exchanger 91 with the lubrication oil, which has already recovered the heat in the lubrication oil system 60*f*. During this process, the oil of the lubrication oil system 60*f* is cooled down and flows out from the third heat exchanger 91. In the third heat exchanger 91, the heat recovered by the oil system low-temperature heat recovery units 81A, 82B, and 99 via the oil of the lubrication oil system 60*f* is transferred to the water of the water circulation passage 60*a* for recovery.

The water having passed through the third heat exchanger 91 recovers heat while passing through the low-temperature heat recovery units 82, 83, 84, 85A, and 85B of the water circulation passage 60*a* at the side of the power generator 13 (power generator side cooling water system 60*c*), and is stored in the hot water tank (low-temperature heat accumulation unit) 94 for heat accumulation. The water in the hot water tank 94 is fed to the loss recovery heat preheater 26 and the loss recovery heat interheater 29 via the three-way valve 97 by the operation of the water pump 95. The water is then cooled down by heat exchange with the compressed air in the loss recovery heat preheater 26 and the loss recovery heat interheater 29 and fed to the low-temperature heat recovery unit side of the low-temperature heat carrier system 60. It is noted the low-temperature heat carrier (water) is prevented from flowing into the intake preheater (first low-temperature preheater) 21 by closing the valve 102.

In the above descriptions, operations of the compression of the working fluid and operations of the power generation are described separately, however, operations of the compression of the working fluid and operations of the power generation may be simultaneously performed.

When the oil level sensor 108 detects that the oil level of the turbine lubrication oil tank 86 reaches a predetermined lower limit, the valve 105 of the bypass passage 104 is opened by the control device (not illustrated) in any of the following cases: the compression of the working fluid only is performed; the power generation only is performed; the compression of the working fluid and the power generation are both performed; and the compression of the working fluid and the power generation are both suspended.

According to the present invention, the heat of the low-temperature heat generation sections 36, 72A, 72B, 73, 74, 75A, 75B, 81A, 81B, 82, 83, 84, 85A, 85B, 93, 95, 98, and 99 in the compressor 11 and the power generator 13 can be reliably recovered via the oil of the lubrication oil system 60*d* and the cooling water of the water circulation passage 60*a*. In this manner, heat efficiency can be improved. Accordingly, improvement of power generation efficiency can be realized in the compressed fluid storage power generation device 10 by reusing the heat from the low temperature heat sources. That is, the power generation efficiency can be improved in the compressed fluid storage power generation device 10 by minimizing heat exhausted from the low-temperature heat generation sections 36, 72A, 72B, 73, 74, 75A, 75B, 81A, 81B, 82, 83, 84, 85A, 85B, 93, 95, 98, and 99 without being used for power generation and thereby improving the heat efficiency.

Third Embodiment

Figure 13:
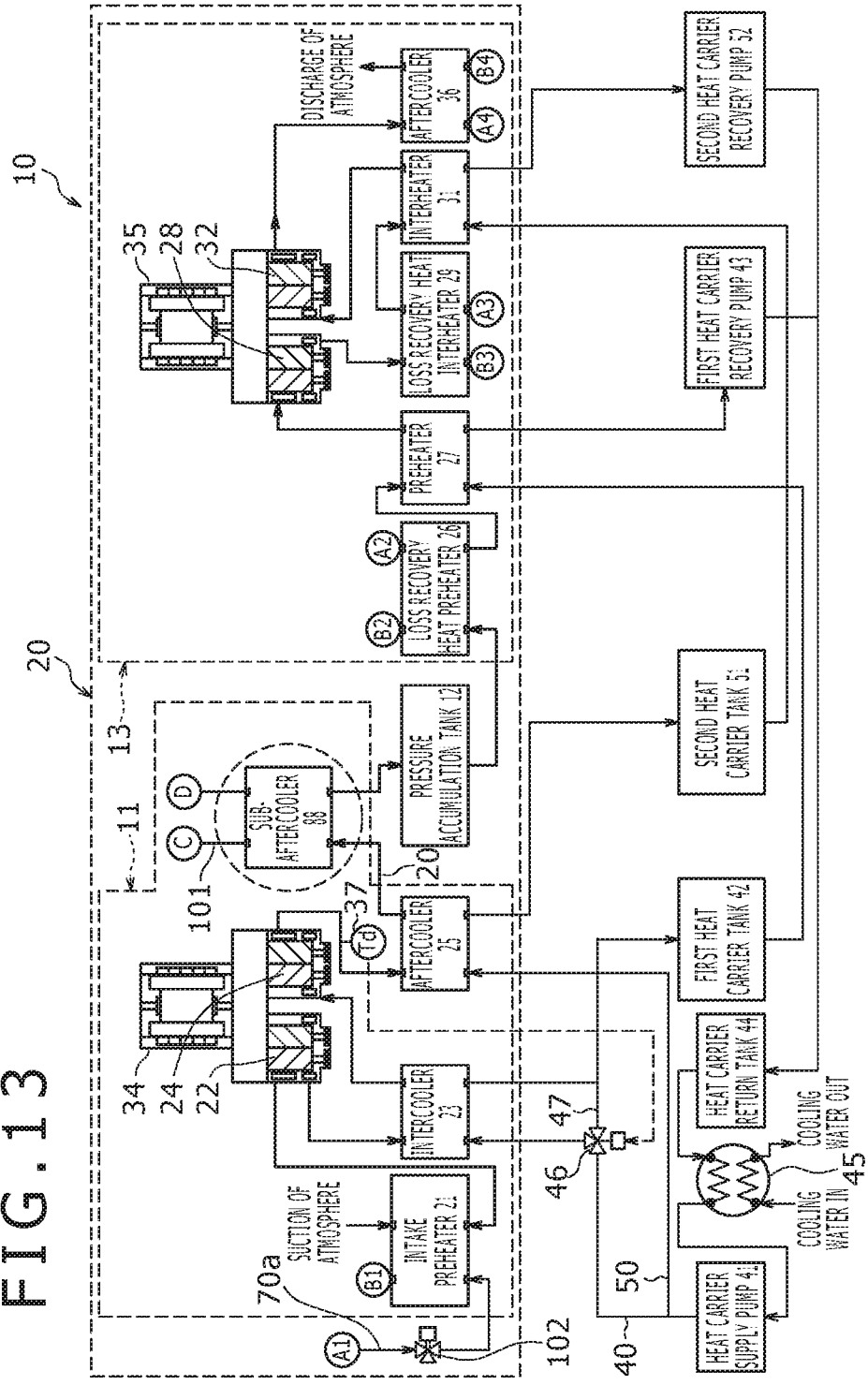
FIG. 13 is a schematic diagram of a compressed fluid storage power generation device according to a third embodiment.
Figure 14:
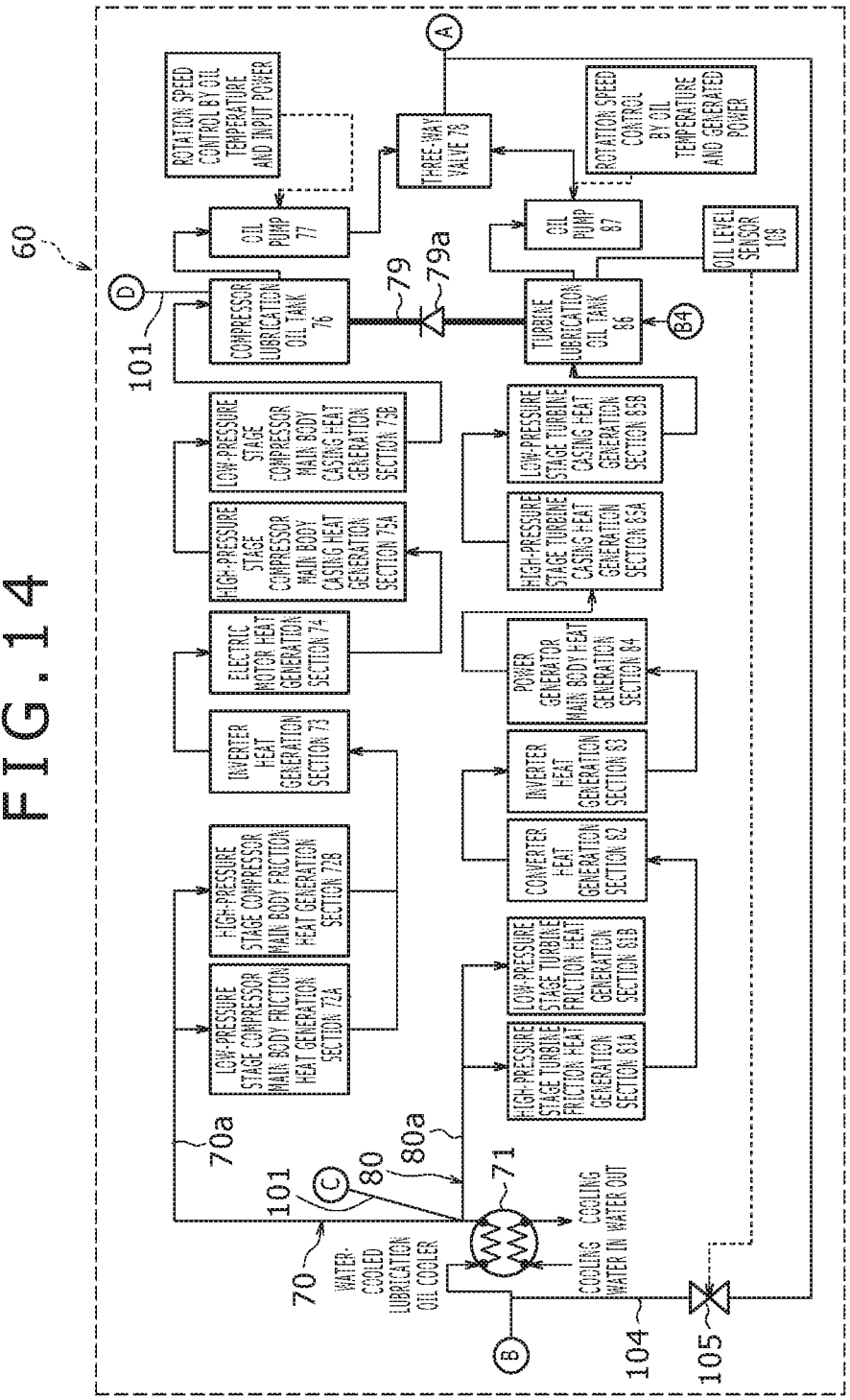
FIG. 14 is a diagram showing a low-temperature heat carrier system in the compressed fluid storage power generation device according to the third embodiment.

FIG. 13 shows a compressed fluid storage power generation device 10 according to a third embodiment of the present invention. FIG. 14 shows a low-temperature heat carrier system 60 in the compressed fluid storage power generation device 10 according to the third embodiment of the present invention. It is noted that description of the low-temperature heat carrier system 60 is omitted in FIG. 13.

Configurations of the present embodiment are identical to those of the first embodiment except that a sub-aftercooler 88 is provided between the aftercooler 25 and the pressure accumulation tank 12 of the air system 20, and that a low-temperature heat recovery passage 101 branched from the low-temperature heat carrier system 60 and merging to the low-temperature heat carrier system 60 is provided. One end of the low-temperature heat recovery passage 101 is connected to a branch portion of the compressor side low-temperature heat carrier system 70 and the power generator side low-temperature heat carrier system 80 of the low-temperature heat carrier system 60, while the other one end is connected to the compressor lubrication oil tank 76 of the compressor side low-temperature heat carrier system 70. A connection portion indicated by C in FIG. 13 and a connection portion indicated by C in FIG. 14 are connected to each other, and a connection portion indicated by D in FIG. 13 and a connection portion indicated by D in FIG. 14 are connected to each other.

The sub-aftercooler 88 is a heat exchanger for exchanging heat between the compressed air in the air system 20 and the low-temperature heat carrier in the low-temperature heat recovery passage 101.

During the compression of the working fluid, the compressed air flows in the air system 20 as in the case of the first embodiment. On the other hand, in the low-temperature heat carrier system 60, the low-temperature heat carrier having passed through the second heat exchanger 71 flows into the compressor side low-temperature heat carrier system 70, the power generator side low-temperature heat carrier system 80, and the low-temperature heat recovery passage 101.

The low-temperature heat carrier flowing through the low-temperature heat recovery passage 101 flows in from a heat carrier inlet and flows out from a heat carrier outlet of the sub-aftercooler 88. In the sub-aftercooler 88, the low-temperature heat carrier flown in is heated by heat exchange with the compressed air of the air system 20. The low-temperature heat carrier heated in the sub-aftercooler 88 flows, via the low-temperature heat recovery passage 101, into the compressor lubrication oil tank 76 and is stored therein. That is, the heat of the low-temperature heat carrier (oil) is accumulated by storing the low-temperature heat carrier (oil) in the compressor lubrication oil tank 76. The compressed air of the air system 20 is cooled down to a temperature close to the atmospheric temperature by the heat exchange, and flows into the pressure accumulation tank (pressure accumulation unit) 12.

According to these configurations, the compressed air fed to the pressure accumulation tank 12 is cooled down to a temperature close to the atmospheric temperature, thus a heat radiation loss in the pressure accumulation tank 12 can be reduced, and remaining compression heat can be recovered to the low-temperature heat carrier (oil).

According to the present invention, the compressed air stored in the pressure accumulation tank 12 can be further cooled down. This can prevent that the heat of the compressed air is radiated from the pressure accumulation tank 12. Further, pressure drop of the compressed air can be suppressed. An amount of drain generated in the pressure accumulation tank 12 along with temperature drop of the compressed air can be reduced.

Forth Embodiment

FIG. 15A and FIG. 15B show a group of heat accumulation tanks in a compressed fluid storage power generation device 10 according to a fourth embodiment of the present invention. FIG. 15A shows a plan view and FIG. 15B shows an elevation view thereof.

The compressed fluid storage power generation device 10 of the present embodiment comprises a container 120 having a length of, for example, 20 feet. The container 120 houses a group of heat accumulation tanks, a group of heat exchangers, and a group of pumps. Configurations of the present embodiment are substantially identical to those of the first embodiment (see FIG. 1 to FIG. 10) except this point.

The group of heat accumulation tanks includes the first heat carrier tank 42, the second heat carrier tank 51, the compressor lubrication oil tank 76, the turbine lubrication oil tank 86, and the heat carrier return tank 44. The container 120 is preferably a heat insulation container (also called thermal container) having an insulation material inside.

The group of heat exchangers includes the first heat exchanger 45 and the second heat exchanger 71. It is noted that the first heat exchanger 45 is located rearer than the second heat carrier recovery pump 52 in FIG. 15B, thus it is not shown in the FIG. 15A and FIG. 15B.

The group of pumps includes the first heat carrier recovery pump 43, the second heat carrier recovery pump 52, the heat carrier supply pump 41, and the oil pumps 77 and 87. It is noted that the first heat carrier recovery pump 43 is located in the rear of the second heat carrier recovery pump 52 in FIG. 15B, thus it is not shown in the FIG. 15A and FIG. 15B.

A heat loss caused by heat radiation from the group of heat accumulation tanks can be prevented by housing the group of heat accumulation tanks in the container 120. Thus, reduction of the power generation efficiency can be prevented. Further, a container type allows easy transportation and on-site construction. Since the group of heat accumulation tanks is housed in the container 120, they can be installed in an outdoor environment without being exposed to wind and rain. Further, the heat insulation container can prevent heat radiation more reliably.

In the present embodiment, the first heat exchanger 45, the first heat carrier recovery pump 43, the second heat carrier recovery pump 52, the heat carrier supply pump 41, the second heat exchanger 71, the oil pump 77, and the oil pump 87 are housed in the same container 120 as the group of heat accumulation tanks. However, the group of heat exchangers and the group of pumps are not necessarily housed in the same container 120 as the group of heat accumulation tanks. That is, they may be housed in a container different from the container 120 or installed in the outside of the container 120. However, they may be preferably housed in the same container 120 for easy transportation and on-site construction.

Piping and connecting configurations for circulating the heat carrier in the group of heat accumulation tanks are same as those in the first embodiment.

Further, as shown in FIG. 16, the container 120 of the present embodiment preferably comprises a partition 121 in its inside, by which the first heat carrier tank 42, the second heat carrier tank 51, the compressor lubrication oil tank 76, and the turbine lubrication oil tank 86 are housed separately from the heat carrier return tank 44. Temperatures of the low-temperature heat carrier stored inside of the first heat carrier tank 42, the second heat carrier tank 51, the compressor lubrication oil tank 76, and the turbine lubrication oil tank 86 are different from that stored inside of the heat carrier return tank 44. Specifically, the former have higher temperatures than the latter. Thus, installing the partition 121 between them can divide the space of the container and prevent a heat loss caused by heat radiation particularly from the former. Further, a heat loss can be further prevented by using the partition 121 made of an insulation material. It is noted that the container 120 may comprise a first container 122 for housing the first heat carrier tank 42, the second heat carrier tank 51, the compressor lubrication oil tank 76, and the turbine lubrication oil tank 86, and a second container 123 for housing the heat carrier return tank 44.

It is noted that the present invention is not limited to the configurations of the aforementioned embodiments and modifications described below as examples are possible to the invention.

In the aforementioned embodiments, description has been given of the configurations in which the compressor main bodies 22 and 24 are positive displacement-type screw compressor main bodies and the expanders 28 and 32 are positive displacement-type screw expanders. However, the present invention is not limited thereto. For example, the compressor main bodies 22 and 24 may be positive displacement-type screw compressor main bodies and the expanders 28 and 32 may be dynamic-type expanders. Alternatively, the compressor main bodies 22 and 24 may be dynamic-type compressor main bodies and the expanders 28 and 32 may be positive displacement-type screw expanders.

The positive displacement-type compressor main bodies 22 and 24 may be oil-free screw air compressor main bodies and the positive displacement-type turbines 28 and 32 may be oil-free screw turbines. According to this configuration, a discharge temperature of the oil-free screw air compressor main bodies 22 and 24 can be significantly increased as compared to a discharge temperature of the oil-cooled screw air compressor main bodies, and a heating temperature of the working fluid supplied to the expanders 28 and 32 can be significantly increased. Since a possibility of commingling the oil content in the working fluid can be eliminated, a possibility that the oil content is deteriorated inside the pressure accumulation unit 12 can be eliminated. That is, a risk of spontaneous ignition caused by an oxidation reaction of the oil content inside the pressure accumulation unit 12 can be eliminated.

The low-temperature heat carrier system 60 on the compressor 11 side and the low-temperature heat carrier system 60 on the power generator 13 side may be separately installed. Further, only one of the low-temperature heat recovery units on the compressor 11 side and the low-temperature heat recovery units on the power generator 13 side may be installed.

The low-temperature heat recovery unit is only required to include at least one low-temperature heat generation section.

In the aforementioned embodiments, the compressed air from the low-pressure stage expander 32 is subjected to heat recovery by the aftercooler 36 and then discharged to the atmosphere rather than directly discharging the compressed air into the atmosphere. However, heat recovery of the compressed air from the low-pressure stage expander 32 is not limited thereto. The loss recovery heat preheater 26 may use the compressed air from the low-pressure stage expander 32 instead of the low-temperature heat carrier and perform heat exchange between the air flowing from the pressure accumulation tank 12 to the expander 28 and the compressed air to recover the heat from the compressed air. Then, the compressed air may be discharged via an exhaust silencer. Further, the heat of the compressed air from the low-pressure stage expander may be recovered by both the aftercooler 36 and the loss recovery heat preheater 26.

In the aforementioned embodiments, both the air compressor 11 and the air power generator 13 adopt a two-stage system, however they may adopt a single stage system.

Among the first high-temperature heat carrier tank 42, the second high-temperature heat carrier tank 51, and the low-temperature heat carrier tanks 76 (92) and 86 (94), two kinds of these tanks may be combined into one common tank.

The pressure accumulation tank 12 may be a steel tank, a tank utilizing a mine pit, or a bag-like tank submerged in water. Further, the steel tank may be buried under the ground.

In the aforementioned embodiments, examples have been shown in which the device comprises one air compressor and one air power generator. However, a plurality of the air compressors and the air power generators may be connected in parallel. The number of units may be selected according to amounts of input power and output power (kW).

The low-temperature heat carrier may be water.

In the present invention, the low-temperature heat carrier system 60 requires only the connection to at least one of three low-temperature heating units 21, 26 and 29, and not necessarily to be connected to all three low-temperature heating units 21, 26 and 29.

In the aforementioned embodiments, examples have been shown in which the compressor lubrication oil tank 76 and the turbine lubrication oil tank 86 are housed in the container 120 as the low-temperature heat accumulation units. However, the low-temperature heat accumulation unit housed in the container 120 is not limited thereto. The hot water tanks 92 and 94 may be housed in the container 120 as the low-temperature heat accumulation unit.

In the aforementioned embodiments, examples have been shown in which the high-temperature heat accumulation units and the low-temperature heat accumulation units are housed in the same space in the first container. However, a configuration of the first container is not limited thereto. The first container may comprise a partition dividing the first container into a space in which the high-temperature heat accumulation units are housed and a space in which the low-temperature heat accumulation units are housed. The first container may include multiple containers for separately housing the high-temperature heat accumulation units and the low-temperature heat accumulation units into the different containers.

EXPLANATION OF REFERENCE NUMERALS

10 Compressed fluid storage power generation device
11 Compressor
12 Pressure accumulation tank (Pressure accumulation unit)
13 Power generator
20 Air system
21 Intake preheater (First low-temperature preheater) (Low-temperature heating unit)
22 Low-pressure stage compressor main body
22*a* Casing
22*b* Cooling jacket (Low-temperature heat recovery unit)
23 Intercooler (High-temperature heat recovery unit)
23*a* Air inlet
23*b* Air outlet
23*c* Heat carrier inlet
23*d* Heat carrier outlet
24 High-pressure stage compressor main body
24*a* Casing
24*b* Cooling jacket (Low-temperature heat recovery unit)
25 Aftercooler (High-temperature heat recovery unit)
25*a* Air inlet
25*b* Air outlet
25*c* Heat carrier inlet
25*d* Heat carrier outlet
26 Loss recovery heat preheater (Second low-temperature preheater) (low-temperature heating unit)
27 Preheater (high-temperature heating unit)
27*a* Air inlet
27*b* Air outlet
27*c* Heat carrier inlet
27*d* Heat carrier outlet
28 High-pressure stage expander
28*a* Casing
28*b* Cooling jacket (Low-temperature heat recovery unit)
29 Loss recovery heat interheater (Third low-temperature preheater) (Low-temperature heating unit)
31 Interheater (High-temperature heating unit)
31*a* Air inlet
31*b* Air outlet
31*c* Heat carrier inlet
31*d* Heat carrier outlet
32 Low-pressure stage expander
32*a* Casing
32*b* Cooling jacket (Low-temperature heat recovery unit)
34 Electric motor (Drive source)
34*a* Casing of electric motor
34*b* Cooling jacket (Low-temperature heat recovery unit)
35 Power generator main body
35*a* Casing
35*b* Cooling jacket (Low-temperature heat recovery unit)
36 Power generator side aftercooler (Low-temperature heat generation section), (Low-temperature heat recovery unit)
37 Compressed air temperature sensor
40 First high-temperature heat carrier system
41 Heat carrier supply pump
42 First heat carrier tank (First high-temperature heat accumulation unit)
43 First heat carrier recovery pump
44 Heat carrier return tank
45 First heat exchanger
46 Three-way valve
47 Bypass passage
50 Second high-temperature heat carrier system
51 Second heat carrier tank (Second high-temperature heat accumulation unit)
52 Second heat carrier recovery pump
60 Low-temperature heat carrier system
60*a* Cooling water system
60*b* Compressor side cooling water system
60*c* Power generator side cooling water system
60*d* Lubrication oil system
60*e* Compressor side lubrication oil system
60*f* Power generator side lubrication oil system
70 Compressor side low-temperature heat carrier system 70a Oil circulation passage
71 Second heat exchanger
72A Low-pressure stage compressor main body friction heat generation section (Low-temperature heat generation section) (Low-temperature heat recovery unit)
72B High-pressure stage compressor main body friction heat generation section (Low-temperature heat generation section) (Low-temperature heat recovery unit)
73 Inverter heat generation section (Low-temperature heat generation section) (Low-temperature heat recovery unit)
73a Casing of inverter
74 Electric motor heat generation section (Low-temperature heat generation section) (Low-temperature heat recovery unit)
75A High-pressure stage compressor main body casing heat generation section (Low-temperature heat generation section) (Low-temperature heat recovery unit)
75B Low-pressure stage compressor main body casing heat generation section (Low-temperature heat generation section) (Low-temperature heat recovery unit)
76 Compressor lubrication oil tank (Low-temperature heat accumulation unit)
77 Oil pump (Low-temperature heat generation section) (Low-temperature heat recovery unit)
78 Three-way valve
79 Communication passage
79a Check valve
80 Power generator side low-temperature heat carrier system
80a Oil circulation passage
81A High-pressure stage turbine friction heat generation section (Low-temperature heat generation section) (Low-temperature heat recovery unit)
81B Low-pressure stage turbine friction heat generation section (Low-temperature heat generation section) (Low-temperature heat recovery unit)
82 Converter heat generation section (Low-temperature heat generation section) (Low-temperature heat recovery unit)
82a Casing of converter
83 Inverter heat generation section (Low-temperature heat generation section) (Low-temperature heat recovery unit)
83a Casing of inverter
84 Power generator main body heat generation section (Low-temperature heat generation section) (Low-temperature heat recovery unit)
85A High-pressure stage turbine casing heat generation section (Low-temperature heat generation section) (Low-temperature heat recovery unit)
85B Low-pressure stage turbine casing heat generation section (Low-temperature heat generation section) (Low-temperature heat recovery unit)
86 Turbine lubrication oil tank (Low-temperature heat accumulation unit)
87 Oil pump (Low-temperature heat generation section) (Low-temperature heat recovery unit)
88 Sub-aftercooler
91 Third heat exchanger (Oil/water heat exchanger)
92 Hot water tank (Low-temperature heat accumulation unit)
93 Water pump
94 Hot water tank (Low-temperature heat accumulation unit)
95 Water pump
96 Communication passage
96a Check valve
97 Three-way valve
98 Oil pump (Low-temperature heat generation section)
99 Oil pump (Low-temperature heat generation section)
101 Low-temperature heat recovery passage
102 Valve
104 Bypass passage
105 Valve
106 Passage
108 Oil level sensor
111 Valve
112 Valve
120 Container
121 Partition
122 First container
123 Second container

The invention claimed is:

1. A compressed fluid storage power generation device, comprising:
a compressor having a drive source and a compressor main body for compressing a working fluid by being driven by the drive source;
a pressure accumulation unit for storing the working fluid compressed by the compressor main body;
a power generator having an expander driven by the working fluid supplied from the pressure accumulation unit and a power generator main body driven by the expander;
a high-temperature heat recovery unit for recovering heat from the working fluid flowing from the compressor main body into the pressure accumulation unit;
a high-temperature heating unit for heating the working fluid flowing from the pressure accumulation unit into the expander by the heat recovered by the high-temperature heat recovery unit;
a low-temperature heat recovery unit for recovering heat generated in a low-temperature heat generation section in at least one of the compressor and the power generator to a low-temperature heat carrier; and
a low-temperature heating unit for heating the working fluid by heat exchange with the low-temperature heat carrier conveying the heat recovered by the low-temperature heat recovery unit.

2. The compressed fluid storage power generation device according to claim 1, wherein the low-temperature heat carrier is at least one of oil and water.

3. The compressed fluid storage power generation device according to claim 1, wherein the low-temperature heat generation section includes a friction heat generation section.

4. The compressed fluid storage power generation device according to claim 3, wherein the friction heat generation section includes at least one of a bearing friction heat generation section and a gear friction heat generation section.

5. The compressed fluid storage power generation device according to claim 1, wherein:
the drive source is an electric motor;
the low-temperature heat generation section includes a casing of the electric motor; and
the low-temperature heat recovery unit includes a cooling jacket, which is provided in the casing of the electric motor and through which the low-temperature heat carrier flows.

6. The compressed fluid storage power generation device according to claim 1, wherein:

the drive source is an electric motor having an inverter controlling a rotation speed;
the low-temperature heat generation section includes a casing of the inverter; and
the low-temperature heat recovery unit includes a heat sink, which is provided in the casing of the inverter and through which the low-temperature heat carrier flows.

7. The compressed fluid storage power generation device according to claim 1, wherein:
the low-temperature heat generation section includes a casing of the compressor main body; and
the low-temperature heat recovery unit includes a cooling jacket, which is provided in the casing of the compressor main body and through which the low-temperature heat carrier flows.

8. The compressed fluid storage power generation device according to claim 1, wherein:
the low-temperature heat generation section includes a casing of the power generator main body; and
the low-temperature heat recovery unit includes a cooling jacket, which is provided in the casing of the power generator main body and through which the low-temperature heat carrier flows.

9. The compressed fluid storage power generation device according to claim 1, comprising a converter for converting power generated by the power generator main body and an inverter for reconverting the converted power, wherein:
the low-temperature heat generation section includes at least one of a casing of the converter and a casing of the inverter; and
the low-temperature heat recovery unit includes a heat sink, which is provided in the casing and through which the low-temperature heat carrier flows.

10. The compressed fluid storage power generation device according to claim 1, wherein:
the low-temperature heat generation section includes a casing of the expander; and
the low-temperature heat recovery unit includes a cooling jacket, which is provided in the casing of the expander and through which the low-temperature heat carrier flows.

11. The compressed fluid storage power generation device according to claim 1, wherein:
the low-temperature heat generation section includes a working fluid passage, of a power generator side aftercooler, which is provided on a downstream side of the expander and through which the working fluid having passed through the expander flows; and
the low-temperature heat recovery unit includes a low-temperature heat carrier passage, which is provided in the power generator side aftercooler and through which the low-temperature heat carrier flows.

12. The compressed fluid storage power generation device according to claim 1, wherein:
the compressor main body comprises a low-pressure stage compressor main body and a high-pressure stage compressor main body;
the expander comprises a high-pressure stage expander and a low-pressure stage expander; and
the low-temperature heating unit comprises at least one of:
a first low-temperature preheater, provided on an upstream of the low-pressure stage compressor main body, for heating the working fluid being sucked into the low-pressure stage compressor main body by heat exchange with the low-temperature heat carrier;
a second low-temperature preheater, provided between the pressure accumulation unit and the high-pressure stage expander, for heating the working fluid by heat exchange with the low-temperature heat carrier; and
a third low-temperature preheater, provided between the high-pressure stage expander and the low-pressure stage expander, for heating the working fluid by heat exchange with the low-temperature heat carrier.

13. The compressed fluid storage power generation device according to claim 12, comprising:
an intercooler, provided between the low-pressure stage compressor main body and the high-pressure stage compressor main body, for recovering heat of the working fluid to a first high-temperature heat carrier; and
an aftercooler, provided between the high-pressure stage compressor main body and the pressure accumulation unit, for recovering heat of the working fluid to a second high-temperature heat carrier, wherein the device further comprises:
a first high-temperature heat accumulation unit for storing the first high-temperature heat carrier conveying the heat recovered from the working fluid by the intercooler;
a second high-temperature heat accumulation unit for storing the second high-temperature heat carrier conveying the heat recovered from the working fluid by the aftercooler; and
a low-temperature heat accumulation unit, provided between the low-temperature heat generation section and the low-temperature heating unit, for storing the low-temperature heat carrier.

14. The compressed fluid storage power generation device according to claim 13, comprising a first container for housing the first high-temperature heat accumulation unit, the second high-temperature heat accumulation unit, and the low-temperature heat accumulation unit.

15. The compressed fluid storage power generation device according to claim 14, comprising:
a heat carrier return tank, provided on a path extending from the high-temperature heating unit to the first high-temperature heat accumulation unit and the second high-temperature heat accumulation unit, for storing the first high-temperature heat carrier and the second high-temperature heat carrier of which temperatures are decreased after heating the working fluid in the high-temperature heating unit; and
a second container for housing the heat carrier return tank.

16. The compressed fluid storage power generation device according to claim 15, wherein the first container and the second container are a heat insulation container having an insulation material in its inside.

17. The compressed fluid storage power generation device according to claim 15, wherein the first container and the second container are configured to be a single container.

18. The container-type compressed fluid storage power generation device according to claim 17, wherein the single container comprises in its inside a partition by which the first high-temperature heat accumulation unit, the second high-temperature heat accumulation unit, and the low-temperature heat accumulation unit are housed separately from the heat carrier return tank.

19. The compressed fluid storage power generation device according to claim 13, comprising a sub-aftercooler provided between the aftercooler and the pressure accumulation unit.

20. The compressed fluid storage power generation device according to claim 1, wherein:
the compressor main body is a positive displacement-type compressor main body; and
the expander is a positive displacement-type turbine.

21. The compressed fluid storage power generation device according to claim 20, wherein:
the positive displacement-type compressor main body is an oil-free screw compressor main body; and
the positive displacement-type turbine is an oil-free screw turbine.

22. The compressed fluid storage power generation device according to claim 1, wherein:
the compressor main body is a dynamic-type compressor main body; and
the expander is a positive displacement-type turbine.

23. The compressed fluid storage power generation device according to claim 1, wherein:
the compressor main body is a positive displacement-type compressor main body; and
the expander is a dynamic-type turbine.

* * * * *